United States Patent
Hama et al.

(10) Patent No.: US 12,299,870 B2
(45) Date of Patent: May 13, 2025

(54) IMAGE INSPECTION APPARATUS AND IMAGE INSPECTION METHOD

(71) Applicant: Keyence Corporation, Osaka (JP)

(72) Inventors: Yuichiro Hama, Osaka (JP); Keisuke Fukuta, Osaka (JP); Nobuyuki Kurihara, Osaka (JP)

(73) Assignee: KEYENCE CORPORATION, Osaka (JP)

(*) Notice: Subject to any disclaimer, the term of this patent is extended or adjusted under 35 U.S.C. 154(b) by 501 days.

(21) Appl. No.: 17/686,468

(22) Filed: Mar. 4, 2022

(65) Prior Publication Data

US 2022/0335587 A1 Oct. 20, 2022

(30) Foreign Application Priority Data

Apr. 16, 2021 (JP) .................... 2021-069448

(51) Int. Cl.
*G06T 7/00* (2017.01)
*G06T 7/90* (2017.01)
(Continued)

(52) U.S. Cl.
CPC ............ *G06T 7/001* (2013.01); *G06T 7/90* (2017.01); *G06V 10/46* (2022.01); *G06V 10/56* (2022.01);
(Continued)

(58) Field of Classification Search
CPC ......... G06T 2207/30164; G06T 7/0004; G06T 2207/10152; G06T 7/001; G06T 2200/24;
(Continued)

(56) References Cited

U.S. PATENT DOCUMENTS 8,878,977 B2 11/2014 Sagisaka et al.
9,182,356 B2 11/2015 Nagoshi
(Continued)

FOREIGN PATENT DOCUMENTS

EP 4286939 A1 * 12/2023 ............ G01N 21/84
JP 2009224971 A * 10/2009
(Continued)

OTHER PUBLICATIONS

U.S. Appl. No. 17/686,474, filed Mar. 4, 2022 (59 pages).

*Primary Examiner* — Henok Shiferaw
*Assistant Examiner* — Woo C Rhim
(74) *Attorney, Agent, or Firm* — Kilyk & Bowersox, P.L.L.C.

(57) ABSTRACT

The image inspection apparatus includes an image score calculator and an imaging condition specifier. The image score calculator calculates scores of images, which are produced under different imaging conditions. The imaging condition specifier receives, when two or more thumbnails corresponding to two or more of the images that have a higher score are displayed on the display, selection of one from the two or more thumbnails to specify a set of imaging conditions corresponding to the thumbnail selected. The different imaging conditions include a single-shot set of conditions under which a single-shot image is produced, and a composition series of sets of conditions under which images are captured to produce a composite image from the images. The display shows a reference information display area that indicates reference information representing the single-shot set or composition series of sets in response to the displaying of the two or more thumbnails.

12 Claims, 15 Drawing Sheets

(51) Int. Cl.
  *G06V 10/46*   (2022.01)
  *G06V 10/56*   (2022.01)
  *H04N 7/18*    (2006.01)
  *H04N 23/56*   (2023.01)
  *H04N 23/72*   (2023.01)

(52) U.S. Cl.
  CPC ............ *H04N 7/183* (2013.01); *H04N 23/56* (2023.01); *H04N 23/72* (2023.01); *G06T 2207/10024* (2013.01); *G06T 2207/30164* (2013.01)

(58) Field of Classification Search
  CPC ........... G06T 7/586; G06T 2207/20221; G06T 2207/10024; G06T 5/50; G06T 2207/10004; G06T 7/0006; G06T 7/90; H04N 23/56; H04N 23/741; H04N 23/64; H04N 23/73; H04N 23/74; H04N 7/183; H04N 23/72; H04N 23/631; H04N 23/66; G06V 10/141; G06V 2201/06; G06V 10/44; G06V 10/46; G06V 10/56; G01N 2021/8877; G01N 2021/8887; G01N 21/8851
  See application file for complete search history.

(56) References Cited

U.S. PATENT DOCUMENTS

| | | |
|---|---|---|
| 9,336,586 B2 | 5/2016 | Nagoshi |
| 10,194,095 B2 | 1/2019 | Fujiwara |
| 10,740,886 B1* | 8/2020 | Lebrun ................. G06T 7/0002 |
| 11,042,976 B2 | 6/2021 | He |
| 11,042,977 B2 | 6/2021 | Kurihara et al. |
| 11,087,456 B2 | 8/2021 | Hino et al. |
| 11,933,739 B2* | 3/2024 | Shibata ................ H04N 23/667 |
| 2005/0196040 A1* | 9/2005 | Ohara ................... H04N 1/6052 382/167 |
| 2006/0071947 A1* | 4/2006 | Ubillos ................. G06F 3/0483 345/619 |
| 2008/0122944 A1* | 5/2008 | Zhang ................... H04N 23/61 348/222.1 |
| 2009/0174795 A1* | 7/2009 | Kato ...................... H04N 23/71 348/E9.053 |
| 2010/0020224 A1* | 1/2010 | Hattori ................ G11B 27/105 382/224 |
| 2010/0110180 A1* | 5/2010 | Tonogai ............... H04N 23/741 348/136 |
| 2010/0189356 A1* | 7/2010 | Sugita ................... H04N 23/70 715/838 |
| 2011/0188779 A1* | 8/2011 | Sakanaga ................ G06T 5/50 382/294 |
| 2012/0105664 A1* | 5/2012 | Kang .................... G06V 20/41 348/222.1 |
| 2013/0128027 A1 | 5/2013 | Katsurada et al. |
| 2014/0168709 A1* | 6/2014 | Tokumaru ............... G06T 7/001 358/1.18 |
| 2014/0270397 A1* | 9/2014 | Sochi ...................... G06T 7/001 382/112 |
| 2015/0022638 A1* | 1/2015 | Saeki ................... G06T 7/0004 348/46 |
| 2015/0355103 A1* | 12/2015 | Ando ...................... G06T 7/586 348/46 |
| 2015/0358602 A1* | 12/2015 | Mayumi ................ H04N 23/56 348/46 |
| 2017/0032177 A1* | 2/2017 | Suenaga .................... G06T 7/74 |
| 2017/0061209 A1* | 3/2017 | Watanabe ............ G06V 10/772 |
| 2018/0068433 A1* | 3/2018 | Imakoga ................ G06T 7/586 |
| 2018/0089818 A1* | 3/2018 | Kobayashi ............ G06T 7/001 |
| 2018/0328855 A1* | 11/2018 | Kido .................. G01N 21/8851 |
| 2018/0330489 A1* | 11/2018 | Kido .................. G06T 3/153 |
| 2018/0330490 A1* | 11/2018 | Kido .................. G01N 21/8806 |
| 2018/0347970 A1* | 12/2018 | Sasaki ............... G01B 11/2513 |
| 2018/0350106 A1* | 12/2018 | Kasilya Sudarsan ........ H04N 23/633 |
| 2019/0064078 A1* | 2/2019 | Matsuda ............... G06T 7/0004 |
| 2019/0268522 A1* | 8/2019 | Hayashi ................ G06T 7/0004 |
| 2019/0281213 A1* | 9/2019 | Kato ..................... B25J 9/1664 |
| 2019/0287235 A1* | 9/2019 | Ikeda ..................... G06T 7/62 |
| 2019/0289196 A1* | 9/2019 | Kato ..................... G05B 19/05 |
| 2020/0043157 A1* | 2/2020 | Ando ................. G01N 21/8806 |
| 2020/0364840 A1* | 11/2020 | Kurihara ................ G06T 7/001 |
| 2021/0364447 A1* | 11/2021 | Naruse ................ G06V 10/772 |
| 2022/0130029 A1* | 4/2022 | Kaneko ................ G06T 7/0004 |
| 2022/0141441 A1* | 5/2022 | Kaneko ................ G06F 3/04855 348/42 |
| 2022/0318984 A1* | 10/2022 | Hyatt ....................... G06T 5/92 |

FOREIGN PATENT DOCUMENTS

| | | | |
|---|---|---|---|
| JP | 2015021760 A | * | 2/2015 |
| JP | 2015021761 A | * | 2/2015 |
| JP | 2015021763 A | * | 2/2015 |
| JP | 5934516 B2 | * | 6/2016 |
| JP | 2017223458 A | | 12/2017 |
| JP | 2020038215 A | * | 3/2020 ......... G01N 21/8806 |

* cited by examiner

FIG. 17

| | IDEAL IMAGE | SUGGESTION IMAGE | SCORE | CAPTION |
|---|---|---|---|---|
| 1 | CHROMATIC COLOR | | 100% | EXACT AGREEMENT BETWEEN CHROMATIC COLORS |
| 2 | CHROMATIC COLOR | | 75% | DISAGREEMENT BETWEEN CHROMAS OR LIGHTNESSES |
| 3 | CHROMATIC COLOR | CHROMATIC COLOR | 0% | DISAGREEMENT BETWEEN HUES OF CHROMATIC COLORS |
| 4 | CHROMATIC COLOR | ACHROMATIC COLOR | 0% | SCORE 0% IF COLOR CLASSIFICATIONS ARE DIFFERENT |
| 5 | ACHROMATIC COLOR | | 100% | EXACT AGREEMENT BETWEEN ACHROMATIC COLORS |
| 6 | ACHROMATIC COLOR | | 75% | DISAGREEMENT BETWEEN LIGHTNESSES |
| 7 | OFF-SCALE | | 100% | OFF-SCALE EXACT AGREEMENT |
| 8 | OFF-SCALE | | 50% | OFF-SCALE PARTIAL AGREEMENT |

IMAGE INSPECTION APPARATUS AND IMAGE INSPECTION METHOD

CROSS-REFERENCE TO RELATED APPLICATIONS

The present application claims foreign priority based on Japanese Patent Application No. 2021-069448, filed Apr. 16, 2021, the contents of which are incorporated herein by reference.

BACKGROUND

1. Technical Field

The present disclosure relates to an image inspection apparatus, an image-inspection-apparatus control device, an image inspection method, an image inspection program, and a computer-readable storage medium or storage device storing the image inspection program.

2. Description of Related Art

Image inspection apparatuses such as image sensors that capture an image of an inspection object such as a workpiece are used to determine failure/no-failure of the inspection object based on the image captured. In image inspection that uses such an image inspection apparatus, a master image is typically stored, and various types of image inspection tools are applied to the master image stored.

In the case in which a number of image-capture conditions of an illumination light and an image sensor (e.g., the camera) are combined, users will feel it difficult to experientially find an optimum combination of image-capture conditions. To address this, an image inspection apparatus that changes image-capture conditions to various combinations and evaluates images that are captured in the various combinations of image-capture conditions has been developed to determine an optimum combination of image-capture conditions (see Japanese Patent Laid-Open Publication No. JP 2017-223,458 A, for example).

However, an optimum combination of image-capture conditions will vary depending on inspections that are required by users. For this reason, an optimum combination of image-capture conditions cannot be easily automatically determined by such an image inspection apparatus. For example, in the case in which a user wants to inspect the shape of a workpiece, an edge-enhanced image will be generally an optimum image. The reason is that sharp edges will clearly show the shape. In another case in which a user wants to inspect the color of a workpiece, an optimum image can be generally provided by a color-difference enhanced image. In the case in which a user wants to inspect a workpiece from various viewpoints, an optimum image will be provided by a good balanced image in which various feature quantities are held in good balance.

An optimum image for inspection sometimes requires a plurality of images from which the optimum image is composed. For example, a plurality of images can be captured with different exposure time periods to compose an HDR image to reproduce a greater range of luminosity (high-dynamic-range imaging). Also, a plurality of images can be captured with different illumination directions to compose an image. Other imaging can be used to compose an image from a plurality of images to improve image quality. Such imaging that captures a plurality of images to compose an image will increase cycle time to improve image quality. A true optimum image for users will be necessarily determined in accordance not only with image quality but also with cycle time that is required by image composition.

It is one object of the present disclosure to provide an image inspection apparatus, an image-inspection-apparatus control device, an image inspection method and an image inspection program that can easily obtain an image suitable for inspection, and a computer-readable storage medium or storage device storing the image inspection program.

SUMMARY

An image inspection apparatus according to an aspect of the present disclosure includes an illuminator, a camera, a display, an image production condition controller, an image score calculator, and an image production condition specifier. The illuminator irradiates an inspection object with illumination light. The camera receives light that is reflected from the inspection object, which is irradiated by the illuminator, and produces a workpiece image. The display displays the workpiece image, which is produced by the camera. The image production condition controller selects between different image production conditions of the workpiece image production to produce a plurality of workpiece images by controlling the camera. The image score calculator calculates image scores of the plurality of workpiece images, which are produced under the different image production conditions changed by the image production condition controller, as evaluation values of the plurality of workpiece images based on a plurality of feature quantities that represent features of the plurality of workpiece images. The image production condition specifier can receive, when two or more thumbnails corresponding to two or more of the plurality of workpiece images that have a higher image score are displayed on the display, selection of one from the two or more thumbnails to specify a set of image production conditions corresponding to the thumbnail selected. The different image production conditions include a single-shot set of conditions under which a single-shot image is produced when the image is captured, and a composition series of sets of conditions under which images are captured to produce a composite image from the images captured under the sets of conditions. The display can show a reference information display area that indicates reference information representing the single-shot set or composition series of sets under which the workpiece image corresponding to each thumbnail is produced in response to the displaying of the two or more thumbnails, which correspond to two or more of the plurality of workpiece images that have a higher image score. This image inspection apparatus allows users to use reference information together with thumbnails to easily select an image suitable for inspection from the thumbnails corresponding to workpiece images that are suggested based on their image scores to the users. Therefore, users can easily specify image production conditions that can produce an image suitable for inspection.

An image inspection apparatus according to another aspect of the present disclosure includes an illuminator, a camera, an image score calculator, a display, an image production condition specifier. The illuminator irradiates an inspection object with illumination light. The camera receives light that is reflected from the inspection object and produces a workpiece image. The image score calculator selects between different image production conditions of the production of the workpiece image by controlling camera, and calculate image scores of a plurality of workpiece images that are produced under the different image production conditions as evaluation values of the plurality of workpiece images based on a plurality of feature quantities that represent features of the plurality of workpiece images. The display displays two or more thumbnails corresponding to two or more of the plurality of workpiece images that have a higher image score, which is calculated by the image score calculator. The image production condition specifier receives selection of one from the two or more thumbnails to specify a set of inspection conditions corresponding to the thumbnail selected. The image score calculator calculates image scores corresponding to the plurality of feature quantities, which are different from each other, of the plurality of workpiece images, and picks up the two or more of the plurality of workpiece images, which have a higher image score, to be displayed as the two or more thumbnails.

An image inspection apparatus according to another aspect of the present disclosure includes an illuminator, a camera, a display, and a processor. The illuminator irradiates an inspection object with illumination light. The camera receives light that is reflected from the inspection object, which is irradiated by the illuminator, and produces a workpiece image. The display displays the workpiece image, which is produced by the camera. The processor selects between different image production conditions of the workpiece image production to produce a plurality of workpiece images by controlling the camera. Also, the processor calculates image scores of the plurality of workpiece images, which are produced under the different image production conditions, as evaluation values of the plurality of workpiece images based on a plurality of feature quantities that represent features of the plurality of workpiece images. Also, the processor displays two or more thumbnails corresponding to two or more of the plurality of workpiece images that have a higher image score on the display. Also, the processor receives selection of one from the two or more thumbnails, which are displayed on the display, to specify a set of image production conditions corresponding to the thumbnail selected. The different image production conditions include a single-shot set of conditions and a composition series of sets of conditions. A single-shot image is produced under the single-shot set of conditions. Images are captured to produce a composite image from the images captured under the composition series of sets of conditions. The display can show a reference information display area that indicates reference information representing the single-shot set or composition series of sets under which the workpiece image corresponding to each thumbnail is produced in response to the displaying of the two or more thumbnails, which correspond to two or more of the plurality of workpiece images that that have a higher image score. This image inspection apparatus allows users to use reference information together with thumbnails to easily select an image suitable for inspection from the thumbnails corresponding to workpiece images that are suggested based on their image scores to the users. Therefore, users can easily specify image production conditions that can produce an image suitable for inspection.

An image-inspection-apparatus control device according to another aspect of the present disclosure is a device capable of being connected to an illuminator, a camera, and a display. The illuminator irradiates an inspection object with illumination light. The camera receives light that is reflected from the inspection object, which is irradiated by the illuminator, and produces a workpiece image. The display displays the workpiece image, which is produced by the camera. The image-inspection-apparatus control device includes an image production condition controller, an image score calculator, and an image production condition specifier. The image production condition controller selects between different image production conditions of the workpiece image production to produce a plurality of workpiece images by controlling the camera. The image score calculator calculates image scores of the plurality of workpiece images, which are produced under the different image production conditions changed by the image production condition controller, as evaluation values of the plurality of workpiece images based on a plurality of feature quantities that represent features of the plurality of workpiece images. The image production condition specifier can receive, when two or more thumbnails corresponding to two or more of the plurality of workpiece images that have a higher image score are displayed on the display, selection of one from the two or more thumbnails to specify a set of inspection conditions corresponding to the inspection image selected. The different image production conditions include a single-shot set of conditions and a composition series of sets of conditions. A single-shot image is produced under the single-shot set of conditions. Images are captured to produce a composite image from the images captured under the composition series of sets of conditions. The display can show a reference information display area that indicates reference information representing the single-shot set or composition series of sets under which the workpiece image corresponding to each thumbnail is produced in response to the displaying of the two or more thumbnails, which correspond to two or more of the plurality of workpiece images that have a higher image score. This image-inspection-apparatus control device allows users to use reference information together with thumbnails to easily select an image suitable for inspection from the thumbnails corresponding to workpiece images that are suggested based on their image scores to the users. Therefore, users can easily specify image production conditions that can produce an image suitable for inspection.

An image inspection method according to another aspect of the present disclosure is a method of inspecting an inspection object that is irradiated with illumination light by an illuminator by receiving light that is reflected from the inspection object to produce a workpiece image by using a camera. The method includes creating of different image production conditions, calculating of image scores, displaying of two or more thumbnails, and receiving of selection. Different image production conditions are created by using an image production condition controller to control the camera, which captures images of the inspection object under the different image production conditions, whereby producing a plurality of workpiece images in the creating of different image production conditions. The different image production conditions include a single-shot set of conditions and a composition series of sets of conditions. A single-shot image is produced under the single-shot set of conditions. Images are captured to produce a composite image from the images captured under the composition series of sets of conditions. The image scores of the plurality of workpiece images, which are produced under the different image production conditions, are calculated as evaluation values of the plurality of workpiece images based on a plurality of feature quantities that represent features of the plurality of workpiece images by using an image score calculator in the calculating of image scores. The two or more thumbnails corresponding to two or more of the plurality of workpiece images that have a higher image score are displayed on a display in the displaying of two or more thumbnails. The selection of one inspection image from the two or more thumbnails, which are displayed on the display, is received to specify a set of inspection conditions corresponding to the inspection image selected in the receiving of selection. This image inspection method allows users to select an image suitable for inspection from two or more thumbnails corresponding to two or more of a plurality of workpiece images that are suggested based on their image scores to the users. Therefore, users can easily specify image production conditions that can produce an image suitable for inspection.

An image inspection program according to another aspect of the present disclosure is a program of executing a computer to perform inspection of an inspection object that is irradiated with illumination light by an illuminator by receiving light that is reflected from the inspection object to produce a workpiece image by using a camera. The inspection includes creating of different image production conditions, calculating of image scores, displaying of two or more thumbnails, and receiving of selection. Different image production conditions are created by using an image production condition controller to control the camera, which captures images of the inspection object under the different image production conditions, whereby producing a plurality of workpiece images in the creating of different image production conditions. The different image production conditions include a single-shot set of conditions and a composition series of sets of conditions. A single-shot image is produced under the single-shot set of conditions. Images are captured to produce a composite image from the images captured under the composition series of sets of conditions. The image scores of the plurality of workpiece images, which are produced under the different image production conditions, are calculated as evaluation values of the plurality of workpiece images based on a plurality of feature quantities that represent features of the plurality of workpiece images by using an image score calculator in the calculating of image scores. The two or more thumbnails corresponding to two or more of the plurality of workpiece images that have a higher image score are displayed on a display in the displaying of two or more thumbnails. The selection of one inspection image from the two or more thumbnails, which are displayed on the display, is received to specify a set of inspection conditions corresponding to the inspection image selected in the receiving of selection. This image inspection program allows users to select an image suitable for inspection from two or more thumbnails corresponding to two or more of a plurality of workpiece images that are suggested based on their image scores to the users. Therefore, users can easily specify image production conditions that can produce an image suitable for inspection.

A computer-readable storage medium or storage device according to a still another aspect of the present disclosure includes the aforementioned program. The storage medium can be a magnetic disk, optical disc, magneto-optical disk or semiconductor memory such as CD-ROM, CD-R, CD-RW, flexible disk, magnetic tape, MO, DVD-ROM, DVD-RAM, DVD-R, DVD+R, DVD-RW, DVD+RW, Blu-ray, HD DVD (AOD), UHD (trade names), or another medium that can store the program. The program can be distributed in a form stored in the storage medium, and be also distributed through network such as the Internet (downloaded). The storage device can include a general-purpose device or special-purpose device on which the aforementioned program is installed in a form of executable software, firmware or the like. Processes or functions included in the program can be executed by the program software that can be executed by a computer. The processes of parts can be realized by hardware such as certain gate array (FPGA, ASIC), or a form of combination of program software and partial hardware module that realizes parts of elements of hardware.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 17 is a schematic view showing exemplary calculation of image scores; and

DESCRIPTION

Figure 1:
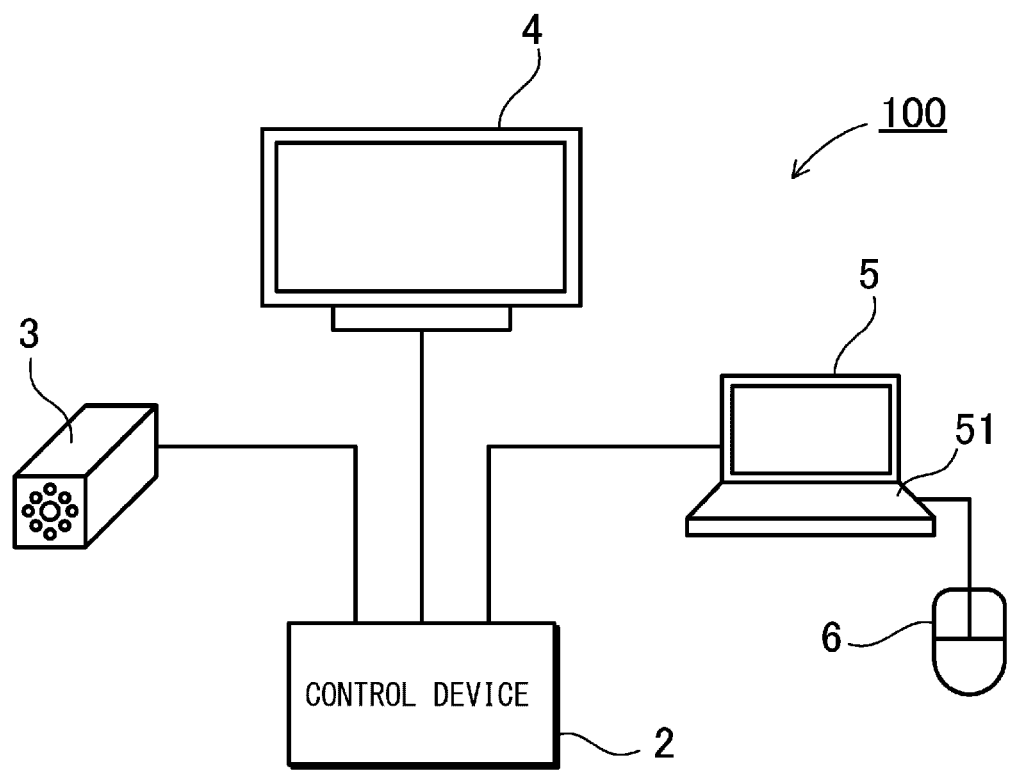
FIG. 1 is a schematic view showing devices of an image inspection apparatus according to an embodiment of the present disclosure.

The following description will describe embodiments according to the present disclosure with reference to the drawings. It should be appreciated, however, that the embodiments described below are illustrations of an image inspection apparatus, an image inspection method, an image inspection program, and a computer-readable storage medium or storage device storing the image inspection program to give an image inspection apparatus, an image inspection method, an image inspection program, and a computer-readable storage medium or storage device storing the image inspection program of the present disclosure are not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown exaggeratingly for ease of explanation. Members same as or similar to those of this present disclosure are attached with the same designation and the same reference signs, and their description is omitted. In addition, a plurality of structural elements of the present disclosure can be configured as a single part that serves the purpose of a plurality of elements, on the other hand, a single structural element can be configured as a plurality of parts that serve the purpose of a single element.

First Embodiment

An image inspection apparatus 100 according to a first embodiment of the present disclosure is now described with reference to a schematic view of FIG. 1. The image inspection apparatus 100 can be used to determine failure/no-failure of an object to be inspected (inspection object) such as various types of industrial parts or products based on an image of the inspection object that is captured by the apparatus, for example. Such an image inspection apparatus is also referred to as an image sensor, etc., and can be used in a manufacturing location such as a factory. Inspection is performed on the entire of or a part of the inspection object. The inspection object can include a plurality of parts to be inspected. Also, one image can include a plurality of inspection objects.

In this embodiment, the image inspection apparatus 100 is illustratively described as an image inspection apparatus that captures an image of an external appearance of an inspection object, and determine failure/no-failure of the inspection object based on the image captured with reference to predetermined inspection standards. Failure/no-failure determination standards that require a no-failure product are previously specified as the predetermined standards, for example. The image inspection apparatus can capture an image of an inspection object, and determine failure/no-failure of the inspection object based on the image captured with reference to the failure/no-failure determination standards when used or operating in the failure/no-failure determination.

The image inspection apparatus 100 includes a main unit as a control device 2, an imaging device 3, a display 4, a personal computer 5, and a pointing device as an operator device 6. An image inspection program that operates the image inspection apparatus 100 is installed on the personal computer 5. User interface screens of the image inspection program can be displayed on a monitor of the personal computer 5 or the display 4. The personal computer 5 is not necessarily included but can be omitted. If the personal computer 5 is omitted, the control device 2 performs image inspection. Alternatively, the image inspection program can be executed in the control device 2.

The monitor or display screen of the personal computer can be used instead of the display 4. Although the control device 2, the imaging device 3, the display 4, the personal computer 5, and the operator device 6 are separately provided in as exemplary devices, which compose the image inspection apparatus 100 shown in FIG. 1, any two or more of the devices can be integrally formed as a single unit. For example, the control device 2 and the imaging device 3, or the control device 2 and the display 4 can be integrally formed as a single unit. Also, the control device 2 can be divided into two or more units, and some of the two or more units can be integrally formed with the imaging device 3 or the display 4. On the other hand, the imaging device 3 can be divided into two or more units, and some of the two or more units can be integrally formed with other device. Although the operator device 6 is illustratively separately provided in FIG. 1, the operator device can be integrally formed with other device by using an input device that is included in the personal computer or by using a touch panel as the display, for example.

The control device 2 is connected to the imaging device 3, the display 4, and the personal computer 5 through cables in the embodiment apparatus shown in FIG. 1. Connection between the devices in the present disclosure is not limited to wired connection but can be wireless connection that uses radio waves, infrared rays, visible light, or the like including wireless LAN, public radio communications services, NFC, and the like. Suitable standard communication protocols or interfaces such as Ethernet, IEEE802.1x and USB, Bluetooth, and ZigBee, which are a registered trademark or trade name, or a suitable dedicated communication protocol or interfaces can be used as communication standards for the image inspection apparatus.

Figure 2:
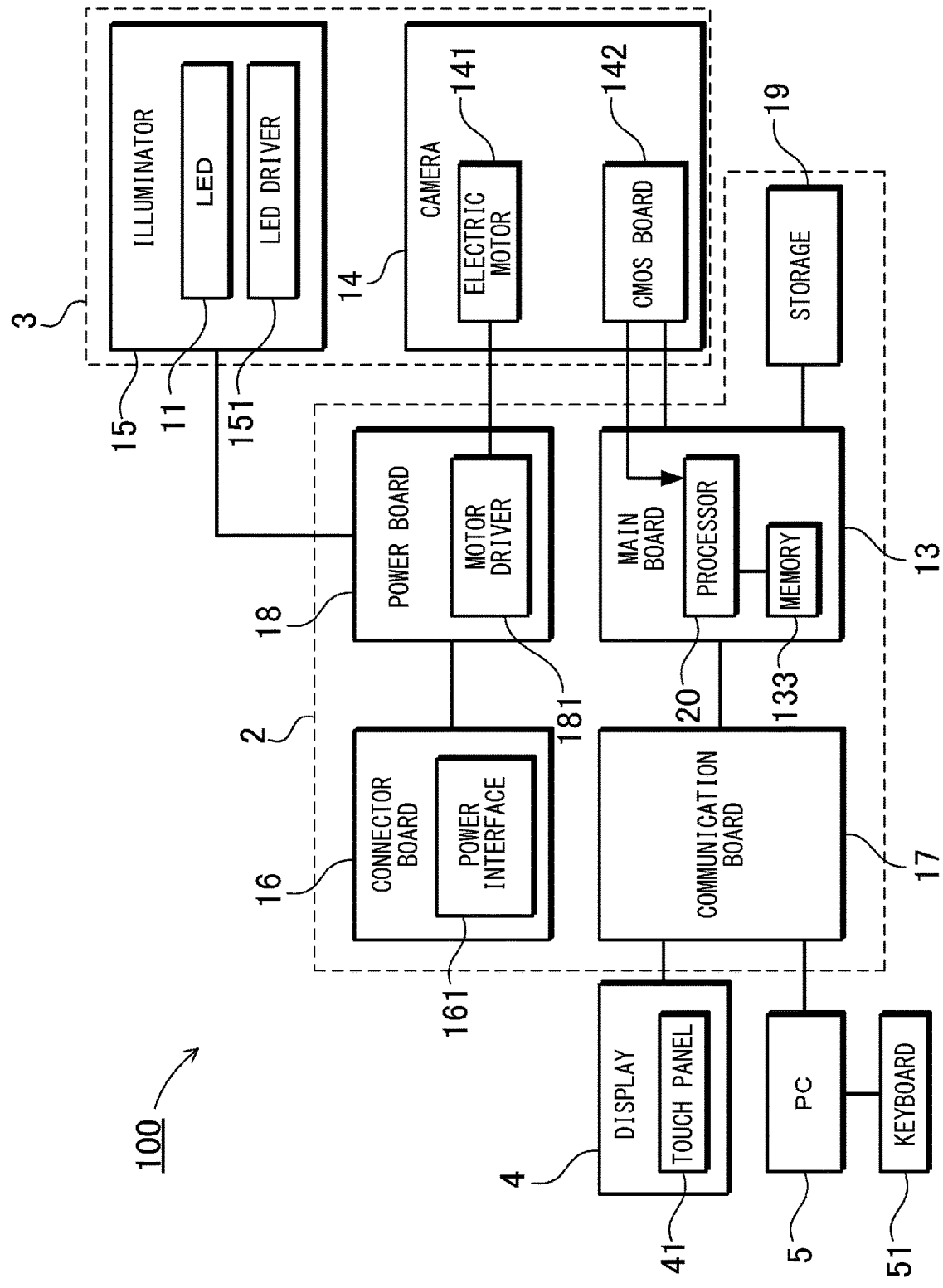
FIG. 2 is a block diagram showing device hardware components of the image inspection apparatus.

FIG. 2 is a block diagram showing device hardware components of the image inspection apparatus 100 according to the first embodiment of the present disclosure. This illustrated image inspection apparatus 100 includes the control device 2, the imaging device 3, the display 4, and the personal computer 5.

(Control Device 2)

The control device 2 includes a main board 13, a connector board 16, a communication board 17, and a power supply board 18. The main board 13 includes a processor 20 and a memory 133. The memory 133 is constructed of a RAM, ROM, or the like.

The connector board 16 is supplied with electric power from an external power supply through a power connector that is includes in a power supply interface 161. The power supply board 18 can supply the electric power supplied to the aforementioned boards. The camera 14 is supplied with electric power through the main board 13 in this embodiment. The power supply board 18 includes an electric motor driver 181, which can supply electric power to drive an electric motor 141 of the camera 14 so that auto-focusing is performed.

The communication board 17 can transmit an OK/NG signal (determination signal) representing a failure/no-failure result of an inspection object that is provided from the main board 13, an image data, and the like to the display 4. The display 4 can display the determination result when receiving the determination signal. Although the determination signal has been illustratively described to be provided through the communication board 17 in this embodiment, the determination signal can be provided through the connector board 16, for example.

(Operator Device 6)

The image inspection apparatus 100 includes the operator device 6, which can receive users' manipulations. Existing input devices such as a keyboard, a mouse, and a touch panel can be used as the operator device 6. The communication board 17 can receive users' various manipulations that are provided from a touch panel 41, which is included in the display 4, and a keyboard 51, which is connected to the personal computer 5, and the like in the embodiment shown in FIG. 2. The touch panel 41 of the display 4 is a known touch type console panel that includes a pressure sensor, which can detect user's touch on the panel, and can provide a touch detection signal to the communication board 17. The personal computer 5 includes a mouse or a touch panel in addition to the keyboard 51, can receive user's various manipulations that are provided from these input devices. Communication of users' manipulations can be wired or wireless communication. Both the wired and wireless communications can be realized by well-known communication modules.

The illuminator 15 includes a plurality of LEDs 11, which can irradiate an image capture area of an inspection object to be inspected with illumination light. The LEDs 11 can include a lens and a reflector. The lens can be changed between short and long range lenses. In this specification, although the illumination light mainly refers to light that is emitted by the illuminator 15, the illumination light can include environmental light, which comes not from such an illuminator but from the outside, such as natural light.

The imaging device 3 includes the camera 14 and the illuminator 15. The camera 14 can automatically focus by driving the electric motor 141. The camera 14 can capture an image of an inspection object in response to imaging instruction signals from the main board 13. The imaging device in this embodiment includes a CMOS board 142. Color images captured can be converted to HDR images in accordance with dynamic range conversion characteristics of the camera by the CMOS board 142. The HDR images will be provided to the processor 20 of the main board 13.

The main board 13 controls operations of the boards that are connected to the main board 13. A control signal that controls ON/OFF and the like of the LEDs 11 can be transmitted to an LED driver 151, which is included in the illuminator 15, for example. The LED driver 151 controls ON/OFF and light amount adjustment of the LEDs 11 in response to the control signal from the processor 20. Also, a control signal that controls auto-focusing can be transmitted through the electric motor driver 181 of the power supply board 18 to the electric motor 141 of the camera 14. Also, an imaging instruction signal can be transmitted to the CMOS board 142.

(Storage 19)

The control device 2 includes a storage 19 such as a hard disk drive or a semiconductor memory. The storage 19 can store a program and a configuration file that execute various types of control and processing by using the aforementioned hardware components, images, determination results, and the like. The program file and the configuration file can be stored in a removable storage medium such as a USB memory or an optical disc, and the control device 2 can load the program file and configuration file, which are stored in the storage medium, for example.

(Processor 20)

The processor 20 of the main board 13 is a control circuit or controlling element that can manipulate or process signals or data that is provided to the processor 20 for various types of calculations, and provide calculation results. The processor 20 is not limited to a processors such as a general-purpose PC CPU, MPU, GPU or TPU, but can be a dedicated gate array (e.g., LSI, FPGA, or ASIC), a microcomputer, a chipset (e.g., SoC), a package, or the like. The processor 20 realizes a plurality of functions discussed later. The processor in the present disclosure is not limited to a physically single processor but can be constructed of a plurality of CPUs and the like. Such two or more CPUs include not only two or more physically separated CPUs but also a so-called MPU, which includes two or more CPU cores in a single package. In the case of such two or more CPUs, two or more physically separated CPUs or CPU cores can realize the plurality of functions. Alternatively, the plurality of functions can be assigned to two or more physically separated CPUs or CPU cores one by one. Also, the processor can be constructed of a CPU and a GPU. In this case, the GPU can realize functions of the aforementioned display controller, and some or all of functions that are assigned to the processor.

In the embodiment shown FIG. 2, the processor 20 of the main board 13 is constructed of an FPGA and a DSP. The FPGA controls illumination and image capturing, and processes digital images captured through an algorithm. The DSP applies edge detection and pattern searching algorithms, etc. to image data. The processor 20 can provide the communication board 17 with a determination result that representing a failure/no-failure result of an inspection object based on a result through the pattern searching algorithm. The memory 133 will store manipulated and calculated results, and the like. The FPGA has been illustratively described to perform the illumination and image capturing controls, and the like in this embodiment, the DSP can perform the illumination and image capturing controls, and the like. A single main control circuit or a single main controlling element can be provided instead of a combination of the FPGA and the DSP. For example, a single CPU as the single main controlling element can function to transmit control signals that control ON/OFF of the LEDs 11 to the LED driver 151, control signals that control auto-focusing to the electric motor 141 of the camera 14, and imaging instruction signals, etc. to the CMOS board 142.

Figure 3:
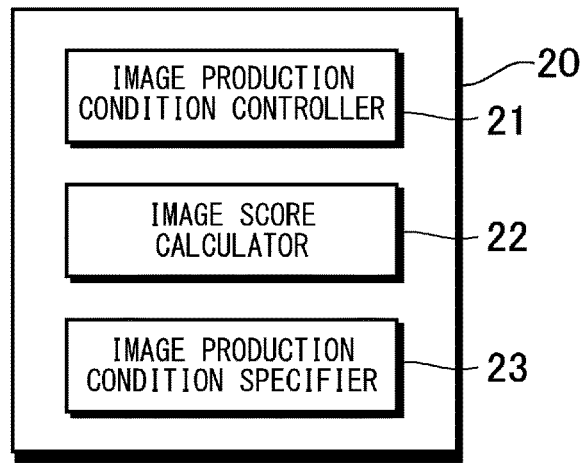
FIG. 3 is a block diagram showing functions of a processor.

FIG. 3 is a block diagram showing the processor 20. The processor 20 realizes an image production condition controller 21, an image score calculator 22, and an image production condition specifier 23 as shown in FIG. 3.

The image production condition controller 21 selects between different image production conditions of workpiece image production to produce a plurality of workpiece images by controlling the camera 14. The image production condition controller 21 also serves as an image-capture condition controller that controls the camera 14 based on image-capture conditions, which are exemplary image production conditions, when the camera 14 captures workpiece images. The workpiece image refers to an image of a workpiece that is captured by the camera.

(Image Score Calculator 22)

The image score calculator 22 calculates image scores of the plurality of workpiece images, which are produced under the different image production conditions changed by the image production condition controller 21, as evaluation values of the plurality of workpiece images based on a plurality of feature quantities that represent features of the plurality of workpiece images, and displays two or more of the plurality of workpiece images that have a higher image score as two or more thumbnails on the display 4. In the case in which first and second feature quantities are specified to be calculated as the plurality of different feature quantities, the image score calculator 22 calculates image scores corresponding to first and second feature quantities of workpiece images. The image score calculator 22 displays a thumbnail corresponding to a workpiece image that has a higher image score corresponding only one of the first and second feature quantities as one of the two or more thumbnails on the display 4. In this case, because the image score calculator calculates image scores corresponding to the plurality of different feature quantities and displays a thumbnail corresponding to a workpiece image that has a higher image score corresponding only one of the different feature quantities, the higher image score image, which will have a distinctive feature, can be displayed as a thumbnail so that users can select the distinctive feature image.

Alternatively, the image score calculator can display a thumbnail corresponding to a workpiece image that has a higher total score as a thumbnail. In this case, the image score calculator 22 can calculate image scores corresponding to the first and second feature quantities of workpiece images, and displays a workpiece image that has higher image scores corresponding to the first and second feature quantities as a thumbnail that has a higher total score on the display 4. In this case, because the image score calculator calculates image scores corresponding to the plurality of different feature quantities and displays a thumbnail corresponding to a workpiece image that has higher image scores corresponding to the first and second feature quantities, users can inspect a workpiece on a single image from various viewpoints.

The image score calculator 22 calculates image scores corresponding to the feature quantities of an inspection object that are included in a target inspection area, which can be specified by a user. In the case in which shape and color in an image are selected as first and second feature quantities, respectively, the image score calculator 22 calculates image scores relating to shape and color as the first and second feature quantities based on edges and colors of an inspection object that are included in a target inspection area, respectively. In the case in which users can specify a target inspection area in advance of calculation of image scores, the image scores will not be affected by unnecessary information that is provided from areas other than the target inspection area. As a result, users can stably inspect workpiece images without affected by unnecessary information such as color or shape that is provided from unnecessary areas.

(Image Production Condition Specifier 23)

The image production condition specifier 23 receives selection of one thumbnail from the two or more thumbnails that are displayed on the display 4 to specify a set of image production conditions corresponding to the thumbnail selected.

(User Interface Screen of Image Inspection Program)

Figure 4:
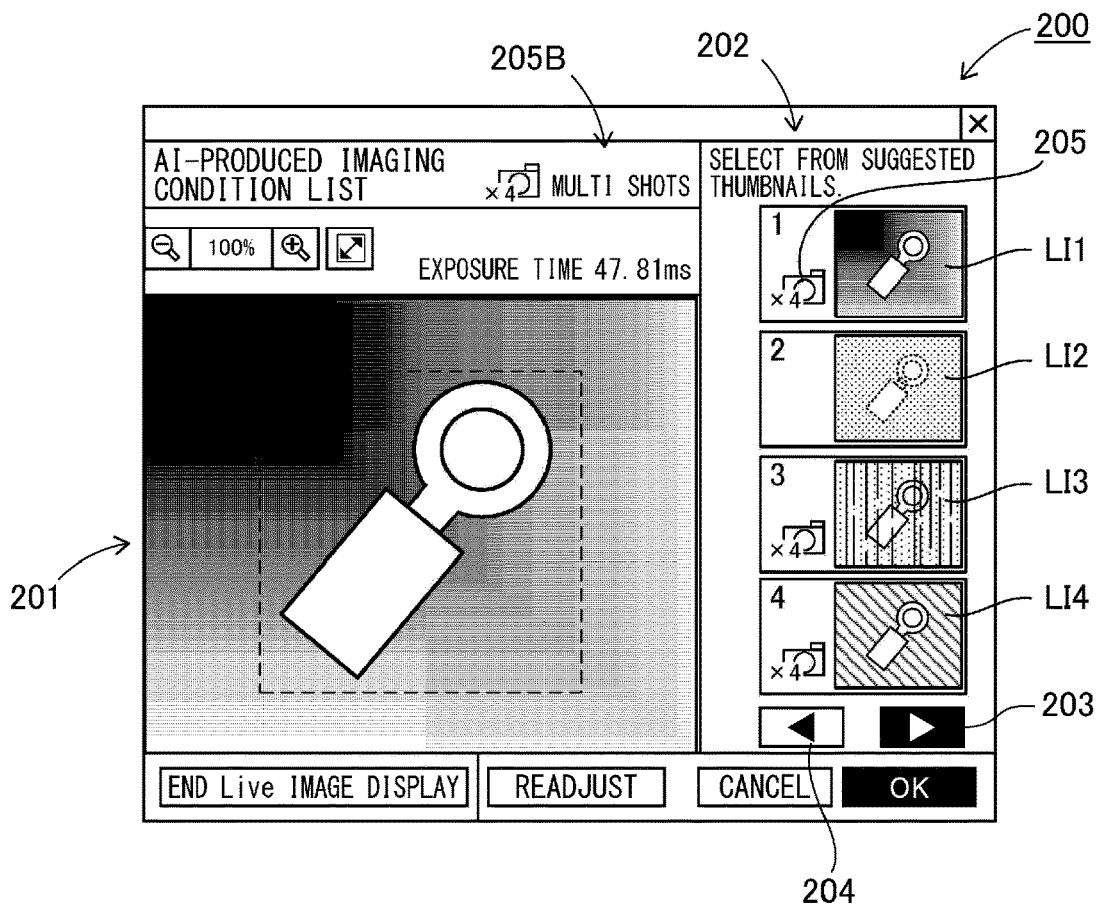
FIG. 4 is a schematic view showing an exemplary user interface screen of an image inspection program.

FIG. 4 is a schematic view showing an exemplary user interface screen of the image inspection program, which is displayed on the display 4. The user interface screen shown in FIG. 4 is an AI-produced imaging condition listing screen 200 of the image inspection program. An image display area 201 and a thumbnail display area 202 are arranged on the left and right side of the screen, respectively. The image display area 201 displays an image that is captured by the camera 14. The image display area 201 can realize a target inspection area specifier that specifies a target inspection area.

(Thumbnail Display Area 202)

Figure 5:
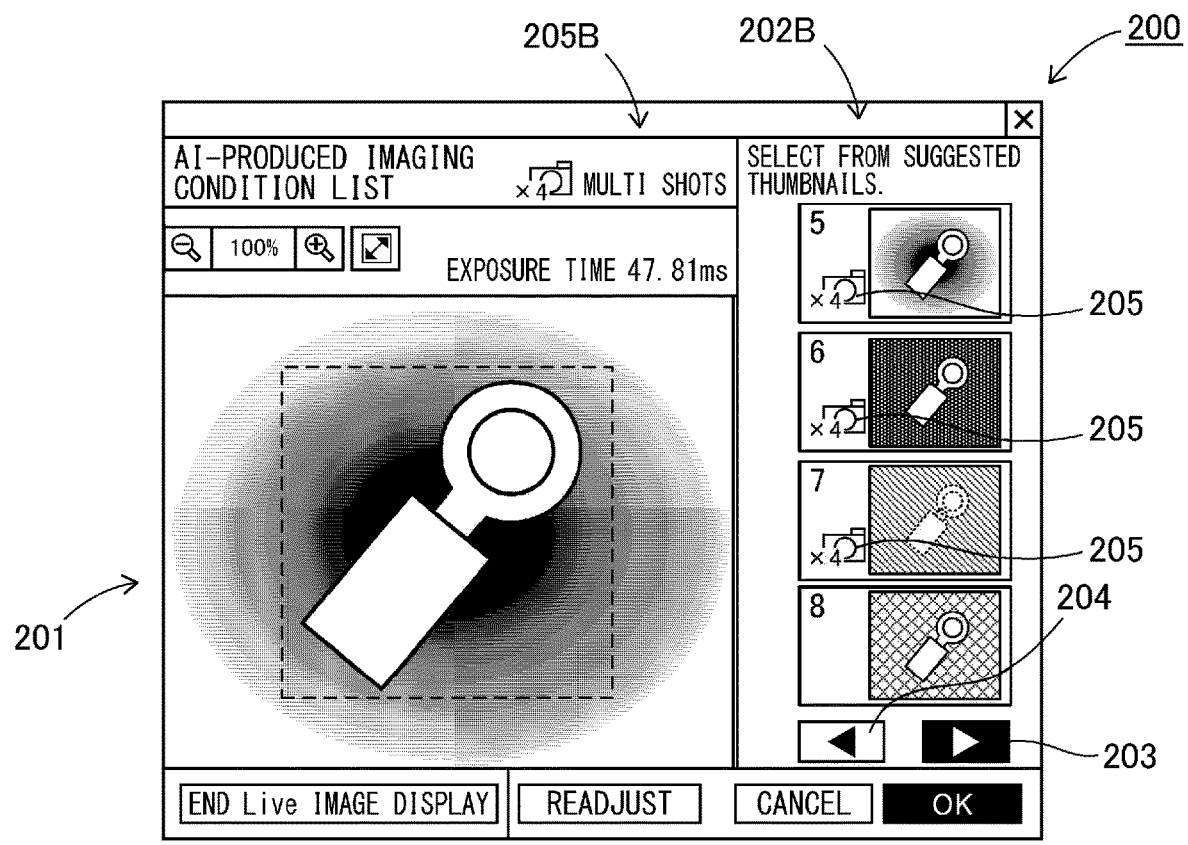
FIG. 5 is another exemplary user interface screen in which its thumbnail display area is changed from FIG. 4.

Two or more thumbnails are listed in the thumbnail display area 202. In the exemplary user interface screen shown in FIG. 4, four thumbnails LI1 to LI4, which are numbered from 1 to 4, are shown in one screen. Other thumbnails can be shown by using rightward and leftward arrow buttons 203 and 204 to change a list of thumbnails. For example, if a user presses the rightward arrow buttons 203 in the exemplary user interface screen shown in FIG. 4, the screen changes to a screen shown in FIG. 5 in which other four thumbnails LI5 to LI8, which are numbered from 5 to 8, are listed in a thumbnail display area 202B. If a user presses the leftward arrow buttons 204 in the exemplary user interface screen shown in FIG. 5, the screen returns to the screen shown in FIG. 4. Known suitable screen change manipulations such as a scroll bar and flicking manipulation can be used instead of the arrow buttons.

The thumbnail display area 202 can realize a thumbnail selector that allows a user to easily select an image suitable for inspection from two or more thumbnails. A user can select suitable one image for inspection of a workpiece from two or more thumbnails that are shown in the thumbnail display area 202 by using an input device such as a mouse or a touch panel. The thumbnail that is selected as a selected image suitable for image inspection by a user specifies image production conditions corresponding to this thumbnail selected. For example, in the case in which failure/no-failure of an inspection object is determined based on an image captured in the image inspection, an image of a no-failure product is necessarily stored as a master image. After the master image is stored, feature quantities of the thumbnail selected such as colors and edges, and image production conditions such as brightness and in-focus degree of the image, illumination light amount and exposure time in the image capturing, and focus position are extracted from the thumbnail or data that is saved in connection with the thumbnail so that they are stored as settings of the image inspection. A master image of a failure product can be stored in addition to the master image of the no-failure product. In this case, boundary conditions that determine whether a product is failure or no-failure can be automatically extracted or created based on the failure and/no-failure products.

In order to list two or more thumbnails, two or more thumbnails are necessarily generated. In this embodiment, the image production condition controller 21 automatically creates two or more sets of different image production conditions, and controls the camera 14 and the illuminator 15 under the two or more sets of different image production conditions to produce a plurality of workpiece images. After workpiece images are produced, the image score calculator 22 calculates image scores as evaluation values of the workpiece images, and selects two or more workpiece images that have a higher image score as two or more thumbnails from the plurality of thumbnails to show the two or more thumbnails in the thumbnail display area 202 of the display 4. More specifically, a predetermined number of thumbnails corresponding to workpiece images that have a higher image score are selected as the two or more thumbnails, and the predetermined number of thumbnails are listed in decreasing order of image score in the thumbnail display area 202.

(Single-Shot Set of Conditions and Composition Series of Sets of Conditions)

The different image production conditions include a single-shot set of conditions and a composition series of sets of conditions. A single-shot workpiece image (single-shot conditioned image) is produced under the single-shot set of conditions. Also workpiece images are captured to produce a composite image (composition conditioned image) from images that are captured under the composition series of sets of conditions. The workpiece images can be classified into the single-shot image, which is produced under the single-shot set of conditions, and the composite image, which is produced from images that are captured under the composition series of sets of conditions. The composite image is produced by composing images of an inspection object that are optically captured under the composition series of sets of conditions. Exemplary composition of images that produces a composite image on demand is now described. In other words, a composite image is produced in real time, and images that are optically captured to produce the composite image are not saved as the data but cleared. However, the present disclosure is not limited to real-time production of a composite image. Single-shot images can be previously saved to produce a composite image by composing the images if required later.

First and second composition series of sets of conditions and the like are included as composition series of sets of conditions. The first composition series of sets of conditions are used to produce a composite image by capturing images by irradiating a workpiece with illumination light in different directions whereby enhancing edges of a shape of the workpiece. The second composition series of sets of conditions are used to produce a composite image by capturing images by irradiating a workpiece with illumination light in different exposure times whereby extending the dynamic range of the camera. The second composition series of sets of conditions is referred to as HDR conditions or the like.

The thumbnail display area 202 shows thumbnails corresponding to both at least one image that has a higher image score corresponding to the single-shot set of conditions and at least one image that has a higher image score corresponding to the composition series of sets of conditions. Images corresponding series of sets of conditions (composition conditioned images) are likely occupy higher ranks if image scores of single-shot and composition conditioned images are simply compared. For this reason, both the single-shot and composition conditioned images that have a higher image score are shown in the thumbnail display area. For example, if an image that has the highest image score is placed in the top rank irrespective of single-shot and composition conditioned images, a composition conditioned image is most likely to be placed in the top rank. To show both the single-shot and composition conditioned images that have a higher image score in the thumbnail display area, a single-shot conditioned image that has the highest image score in single-shot conditioned images is placed in the second rank.

(Reference Information Display Area 205)

Also, reference information of thumbnails can be shown when two or more thumbnails corresponding to a higher image score are displayed on the display 4. The display 4 includes reference information display areas 205 that show the reference information in the exemplary user interface screen shown in FIG. 4. The reference information display areas 205 are arranged beside their corresponding thumbnails, which are shown in the thumbnail display area 202. The reference information display areas 205 are arranged beside the lower left of their corresponding thumbnails in the exemplary user interface screen shown in FIG. 4.

(Reference Information)

The reference information includes information whether a thumbnail, which is displayed on in thumbnail display area 202, is produced under the single-shot set of conditions or the composition series of sets of conditions. Examples of the reference information can be provided by time that is required to produce a workpiece image, image score, the number of images that is required to produce a composite image if a workpiece image is the composite image, the number of photographing shots, type of image composition (e.g., "HDR" or "Light Div."), and the like. Alternatively, the reference information can be a flag such as "Single-Shot" or "Composition". A camera icon and "×4", which is shown on the icon, are shown as the reference information in the exemplary user interface screen shown in FIG. 4. The camera icon and "×4" represent that four images are captured to produce a composite image. A thumbnail that is currently selected in the thumbnail display area 202 is highlighted so that users can easily grasp which thumbnail is currently selected.

A thumbnail that is currently selected in the thumbnail display area 202 can be displayed in an enlarged size in the image display area 201. An additional reference information display area 205B can be provided corresponding to the enlarged image, which is displayed in the image display area 201. A thumbnail LI1, which is displayed in a top area part numbered "1" of the thumbnail display area 202, is currently selected so that the thumbnail LI1 in the top area part "1" is displayed in an enlarged size in the image display area 201 and its reference information is shown in the reference information display area 205B, which is arranged on the upper right side of the image display area 201 in the exemplary user interface screen shown in FIG. 4. An exposure time is shown as additional reference information in addition to the number of images that have been captured to produce a composite image as the image LI1 in the reference information display area 205B. When users select a desired image from two or more thumbnails, they can take the reference information together with the thumbnails into consideration. Consequently, the reference information and the thumbnails can provide a useful environment that allows users to easily select a suitable image for inspection.

Figure 6:
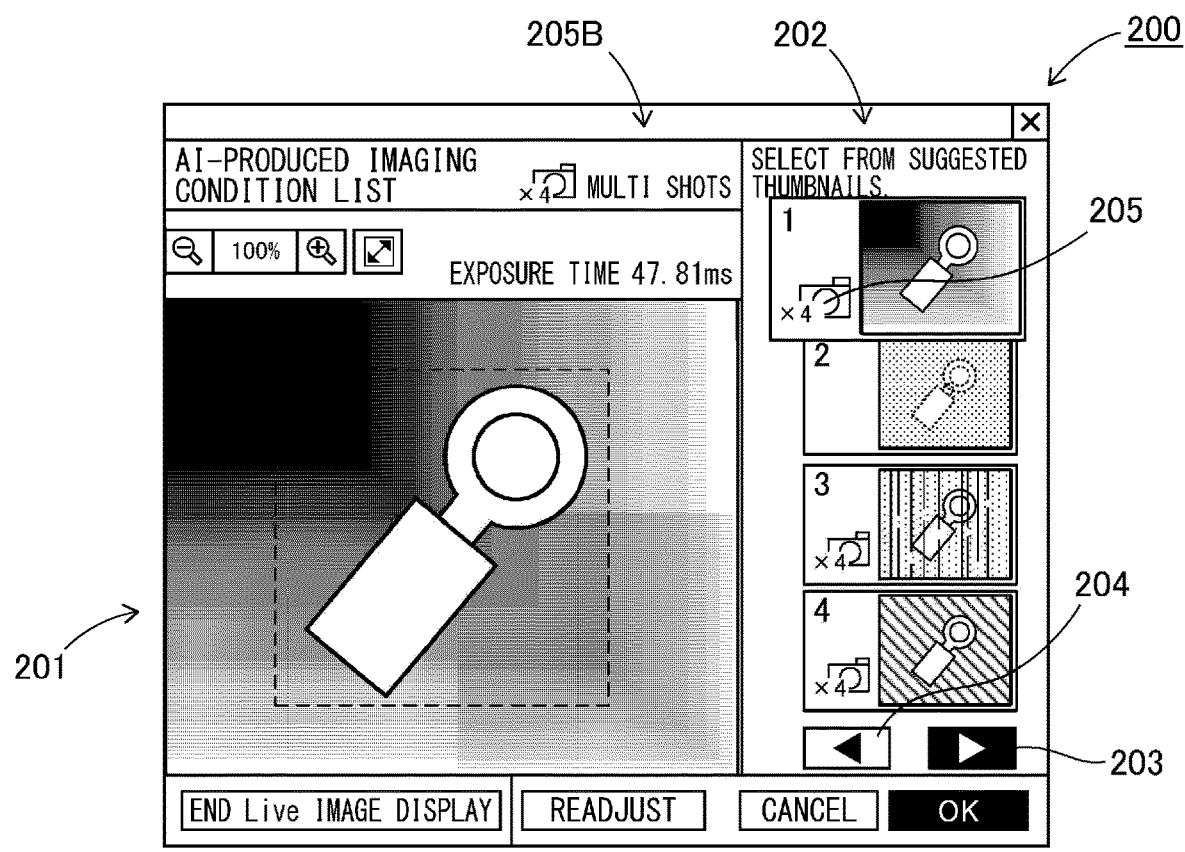
FIG. 6 is a schematic view showing another exemplary user interface screen of the image inspection program.

The thumbnail display area 202 can display a top thumbnail that has the highest image score larger than other thumbnails that have the second highest or lower image scores in factory default settings. FIG. 6 is a schematic view showing such a user interface screen in which a top thumbnail is displayed larger than other thumbnails. A thumbnail LI1 in the top area part "1" is displayed slightly larger than thumbnails LI2 to LI4 in a second top part "2" and the following parts in FIG. 6. The larger thumbnail allows users to easily visually grasp which thumbnail is currently selected. In the case in which the thumbnail LI1 in the top area part "1" is selected, if another thumbnail is newly selected by a user, the thumbnail newly selected is displayed slightly larger and the thumbnail LI1 in the top area part "1" is displayed in a normal thumbnail size. The change of a slightly larger thumbnail to the thumbnail newly selected from the thumbnail previously selected allows users to easily visually grasp the change of a thumbnail that is currently selected. Such a slightly larger thumbnail in the thumbnail display area 202 can show a thumbnail that is currently selected. When thumbnails are selectively created, the thumbnail LI1 in the top area part "1", which has the highest image score, is first selected in the default settings. In this case, the top thumbnail is always suggested to be selected for inspection first.

When workpiece images are successively captured while image production conditions are changed between various sets of image production conditions, an image that is displayed in the image display area 201 on the display 4 can be updated to a workpiece image that is newly captured in real time. Subsequently, when the image score calculator 22 selectively creates two or more thumbnails, the top thumbnail is first displayed relatively larger than the other thumbnails. The image production condition controller 21 can automatically create two or more sets of different image production conditions including brightness of a workpiece image to be displayed on the display 4 and focusing of the camera 14.

Conventional image sensors have a large number of sets of image production conditions. In the conventional image sensors, users experientially find a suitable set of image production conditions from hundreds sets of image production conditions depending on inspection objects (workpieces) by trial and error. Also, even in the case of illuminator-including image sensors, a recent improved illuminator-including image sensor is designed to produce a more suitable image by including an additional illuminator or by changing between different lighting conditions. For this reason, its photo shooting conditions become more complicated. To address this, the image inspection apparatus 100 according to this embodiment determines suitable two or more sets of image production conditions that are suggested to users so that users can select one from the two or more sets of image production conditions suggested. In this embodiment, a number of workpiece images are captured to produce an ideal image from the workpiece images captured. Also, sets of image production conditions are picked up by scoring images that can be suggested to users (suggestion images). A plurality of different evaluation indices are specified in the scoring so that a plurality of ideal images that have their corresponding highest evaluation index are produced. The suggestion images refer to high ranking workpiece images that have a higher image score in the workpiece images captured. The thumbnails refer to thumbnailed images that are produced from the suggestion images.

The image score calculator 22 calculates image scores in accordance with a concordance degree between one of the plurality of ideal images and each workpiece image. In this embodiment, after the plurality of ideal images are produced, an image score is calculated in accordance with a distance between one of the plurality of ideal images and each workpiece image. Also, two or more feature quantities can be specified, and two or more ideal images corresponding to the two or more feature quantities can be produced so that two or more image scores corresponding to the two or more feature quantities can be calculated.

(Ideal Image)

Examples of the feature quantities can be provided by shape (edges), color, and the like as discussed above. Ideal shape and color images can be used as the aforementioned ideal images. In the case in which the ideal color image is produced, priorities can be assigned to color features. For example, priorities can be assigned in the order of chromatic color, achromatic color, and off-scale. The image inspection apparatus can be configured to allow users to choose one feature quantity to be used to produce an ideal image from a plurality of feature quantities. In this case, the image inspection apparatus can include a feature quantity specifier that receives selection of at least one to be used for inspection from the plurality of feature quantities. An exemplary feature quantity specifier can include a feature quantity specification screen that is displayed on the display 4 by the image inspection program so that users can select at least one to be used for inspection from the plurality of feature quantities by using an input device such as a mouse. The image score calculator 22 calculates image scores corresponding to the feature quantity specified, and displays thumbnails that have a higher image score calculated on the display 4. In the case in which users can select a desired one from a plurality of feature quantities, suggestion images corresponding to a desired higher feature quantity can be shown.

A schematic procedure of displaying suggestion images listed in decreasing order of image score is now described with reference to a flowchart of FIG. 7 and schematic views of FIGS. 8 to 11. In this embodiment, an image of an inspection object that is a no-failure product is stored as a master image, and inspection standards are specified to detect features such as an outline, an area, and edges of the inspection object, which are used in image inspection. Exemplary failure/no-failure determination can be performed based on differences between an inspection object and the master image in the image inspection after the master image is stored and the inspection standards are specified.

Figure 7:
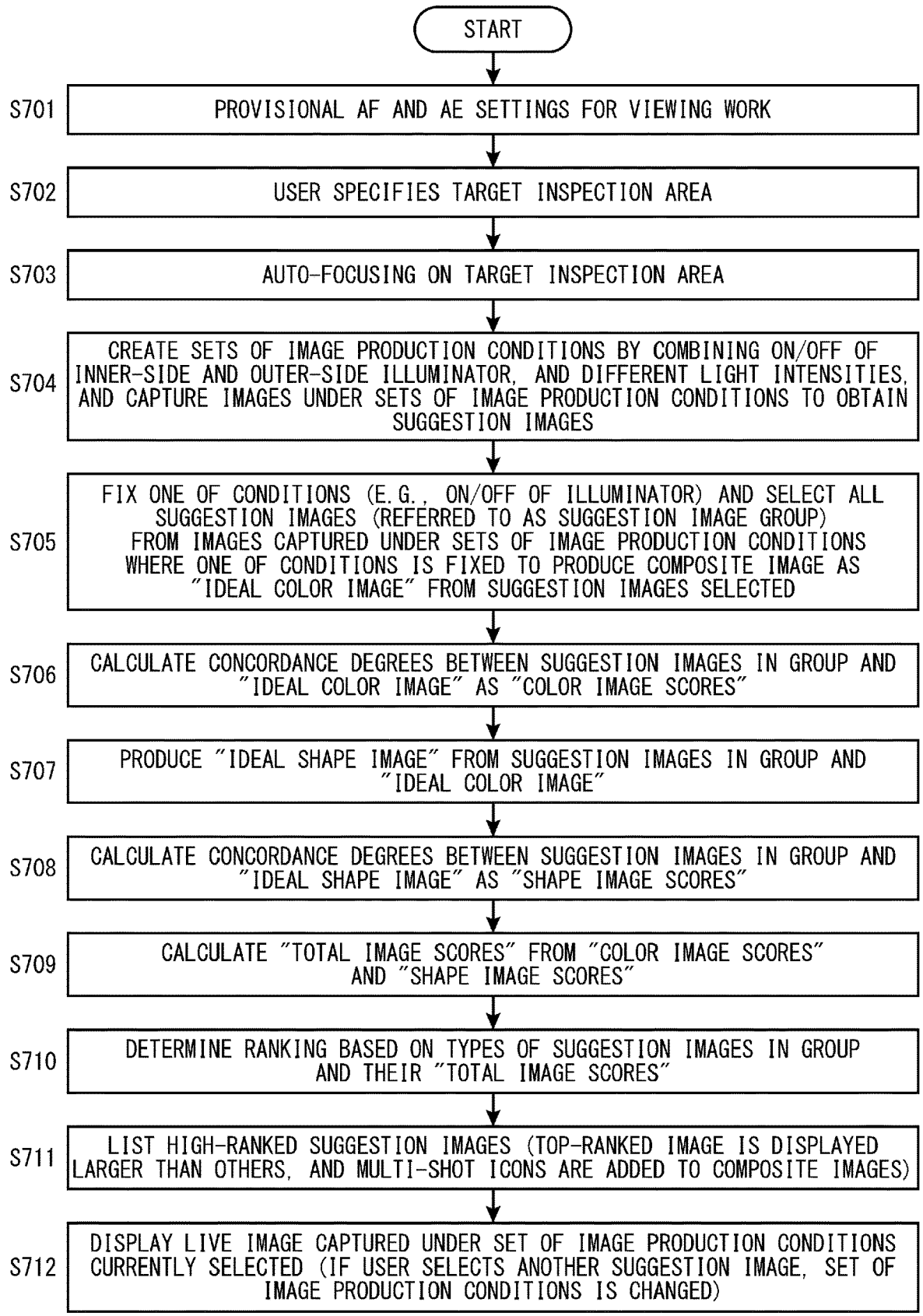
FIG. 7 is a flowchart showing a procedure of showing suggestion images listed in decreasing order of image score.
Figure 8:
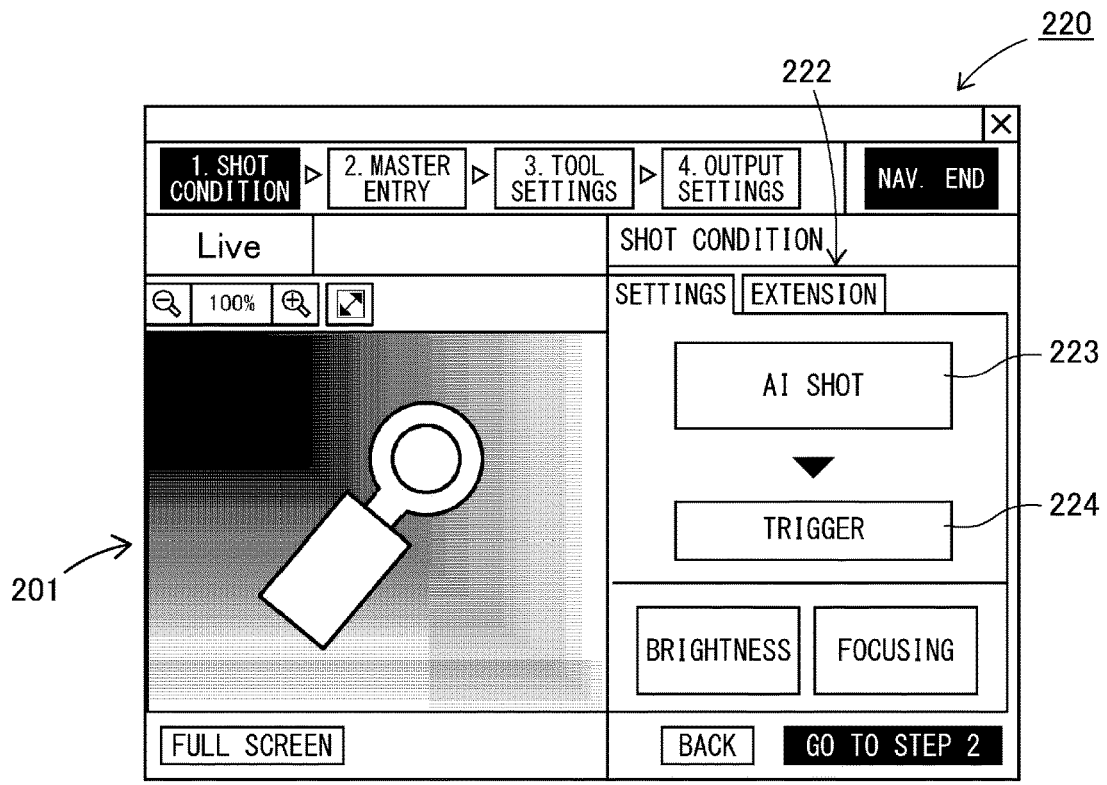
FIG. 8 is a schematic view showing an exemplary image production condition specifying screen.
Figure 9:
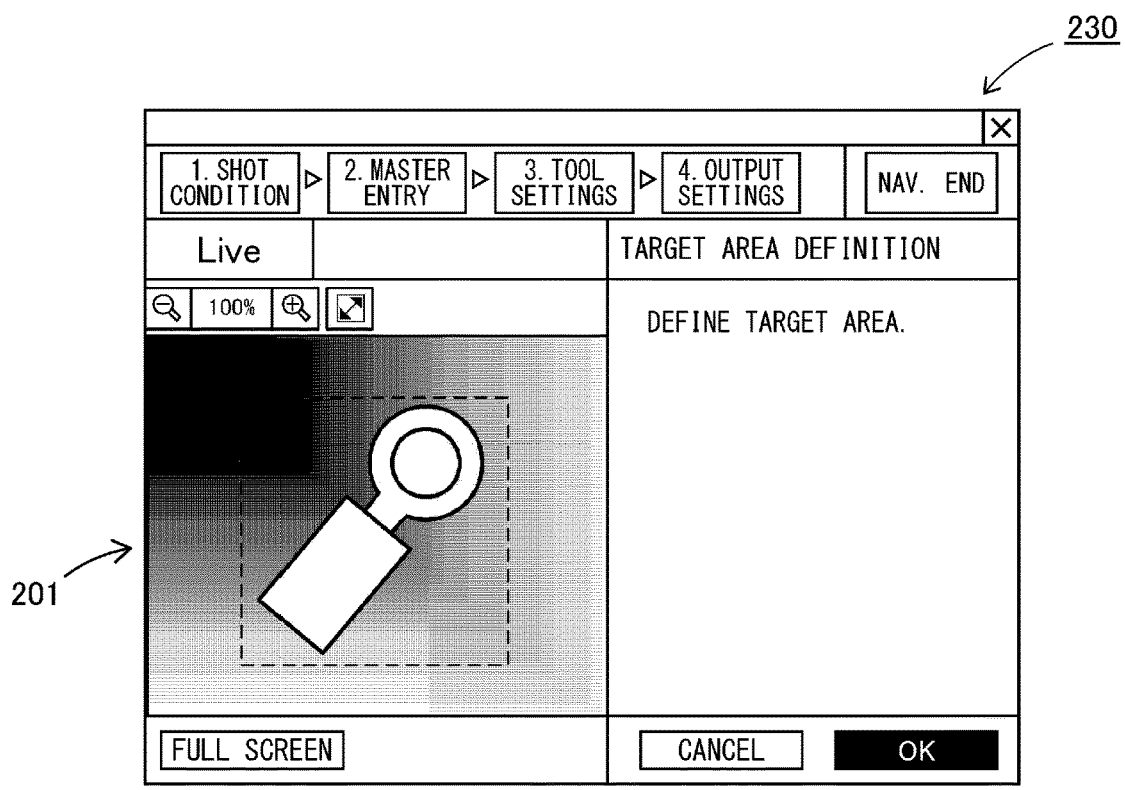
FIG. 9 is a schematic view showing an exemplary area specifying screen.

Auto-focusing (AF) and automatic exposure (AE) are provisionally performed to view the inspection object in Step S701 in the flowchart of FIG. 7. For example, a dialog "Now Adjusting to Proper Brightness & Focus" can be indicated by the image inspection program. Subsequently, a target inspection area is specified by a user in Step S702. The specification of the target inspection area can be received by using the target inspection area specifier. For example, when an "AI Shot" button 223 is clicked in an operator area 222, which is arranged on the right side of an image production condition specifying screen 220 as shown in FIG. 8, the screen changes to an area specifying screen 230 shown in FIG. 9, which is a form of the target inspection area specifier. A live image of the inspection object that is captured by the camera 14 is displayed in the image display area 201 arranged in the left-side of the area specifying screen 230. The live image is displayed as video in which the image is successively updated. In this screen, the user can specify a target inspection area in the image display area 201 by using the input device such as a mouse. In this embodiment, the user can enclose the entire or a part to be inspected of the inspection object that is displayed in the image display area 201 with a closed line whereby specifying the target inspection area. Subsequently, the target inspection area specified is automatically focused in Step S703.

Figure 10:
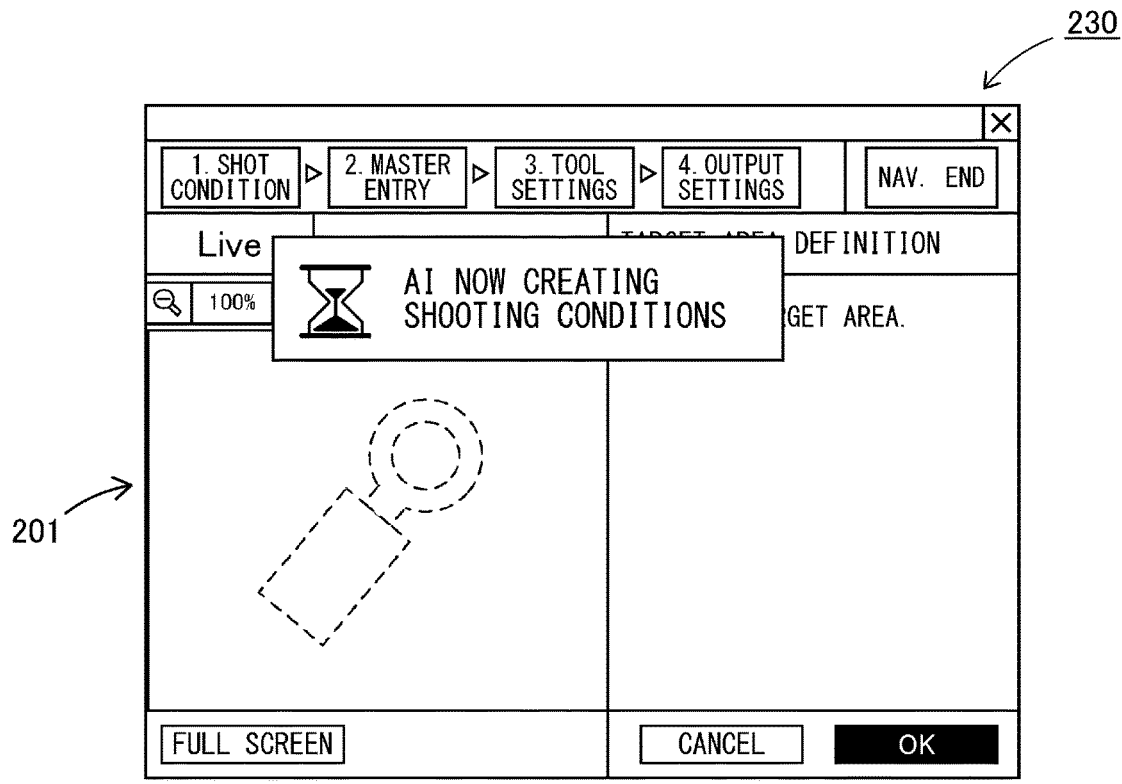
FIG. 10 is a schematic view showing an exemplary screen in which "AI Now Creating Shooting Conditions" is shown.
Figure 11:
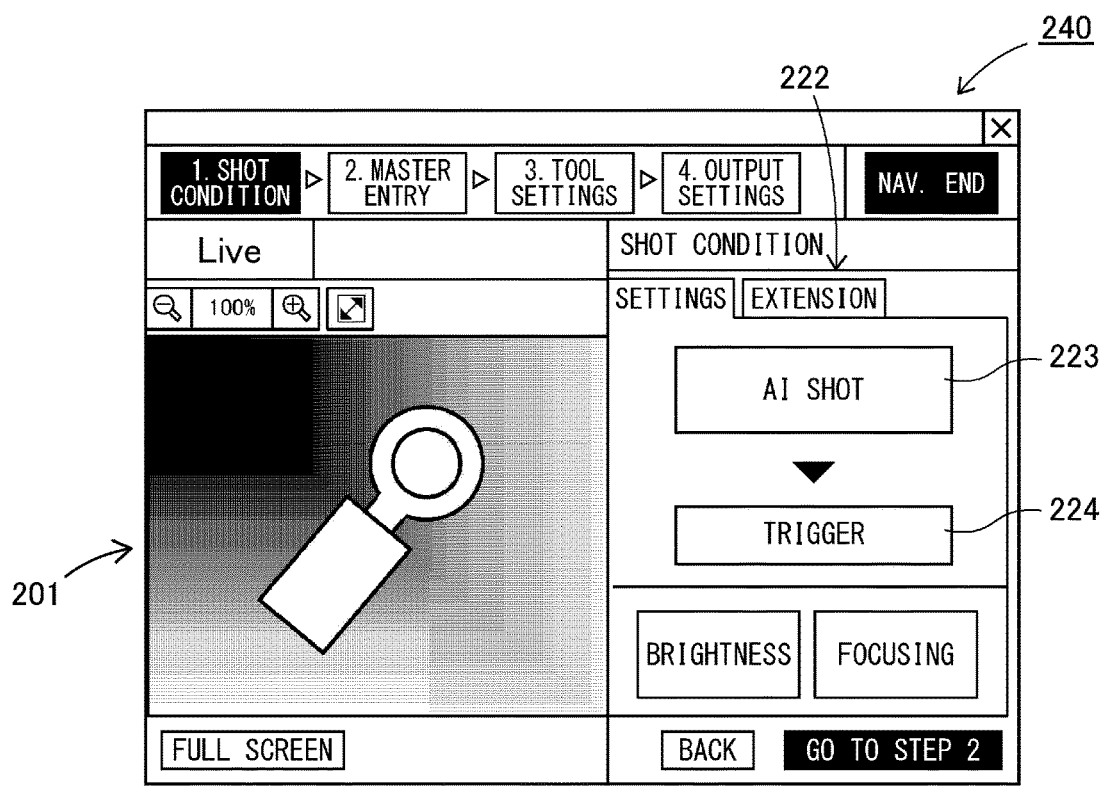
FIG. 11 is a schematic view showing another exemplary image production condition specifying screen.

Subsequently, sets of image production conditions are created by combining ON/OFF of an inner-side illuminator, ON/OFF of an outer-side illuminator and different light intensities, and a number of images are captured under the sets of image production conditions to obtain suggestion images in Step S704. In this embodiment, a dialog "AI Now Creating Shooting Conditions" is indicated as shown in FIG. 10, and a live image of a workpiece in the image display area 201 is updated in real time when a new image of the workpiece is captured. Subsequently, one of the conditions such as ON/OFF of an illuminator is fixed, and all suggestion images are selected from images that are captured under sets of image production conditions in which the one of the conditions is fixed so that a composite image is first produced as an "ideal color image" from the suggestion images selected in Step S705. The suggestion images that are selected in this step referred to as a group of suggestion images (occasionally referred to as a suggestion image group). Subsequently, concordance degrees between the suggestion images in the group and the "ideal color image" are calculated as "color image scores" in Step S706. Subsequently, an "ideal shape image" is produced from the suggestion images in the group and the "ideal color image" in Step S707. Subsequently, concordance degrees between the suggestion images in the group and the "ideal shape image" are calculated as "shape image scores" in Step S708. Subsequently, "total image scores" of the suggestion images in the group are calculated from the "color image scores" and the "shape image scores" in Step S709. Ranking is determined in accordance with types of the suggestion images in the group and their "total image scores" in Step S710.

After the image scores are calculated as discussed above, a listing order of the suggestion images to be shown in the thumbnail display area 202 in accordance with the ranking calculated. Subsequently, high-ranked suggestion images are displayed in the thumbnail display area 202 as shown in FIG. 4 in Step S711. A workpiece image that is captured under a set of image production conditions of brightness and focus corresponding to the top-ranked suggestion image is displayed in the image display area 201. A thumbnail of the top-ranked suggestion image can be displayed relatively larger than the other thumbnails as shown in FIG. 6.

Reference information can be displayed in addition to the thumbnails (Step S712). Icons are indicated in the reference information display area 202 in addition to the thumbnails that are produced by composing a plurality of images that are captured under different conditions in the exemplary user interface screen shown in FIG. 4. After that, the user can select desired one from thumbnails. When the user selects the desired thumbnail, the screen changes from the AI-produced imaging condition listing screen 200 shown in FIGS. 4, 5, etc., to an image production condition specifying screen 240 shown in FIG. 11.

(Ranking Determination Procedure)

Figure 12:
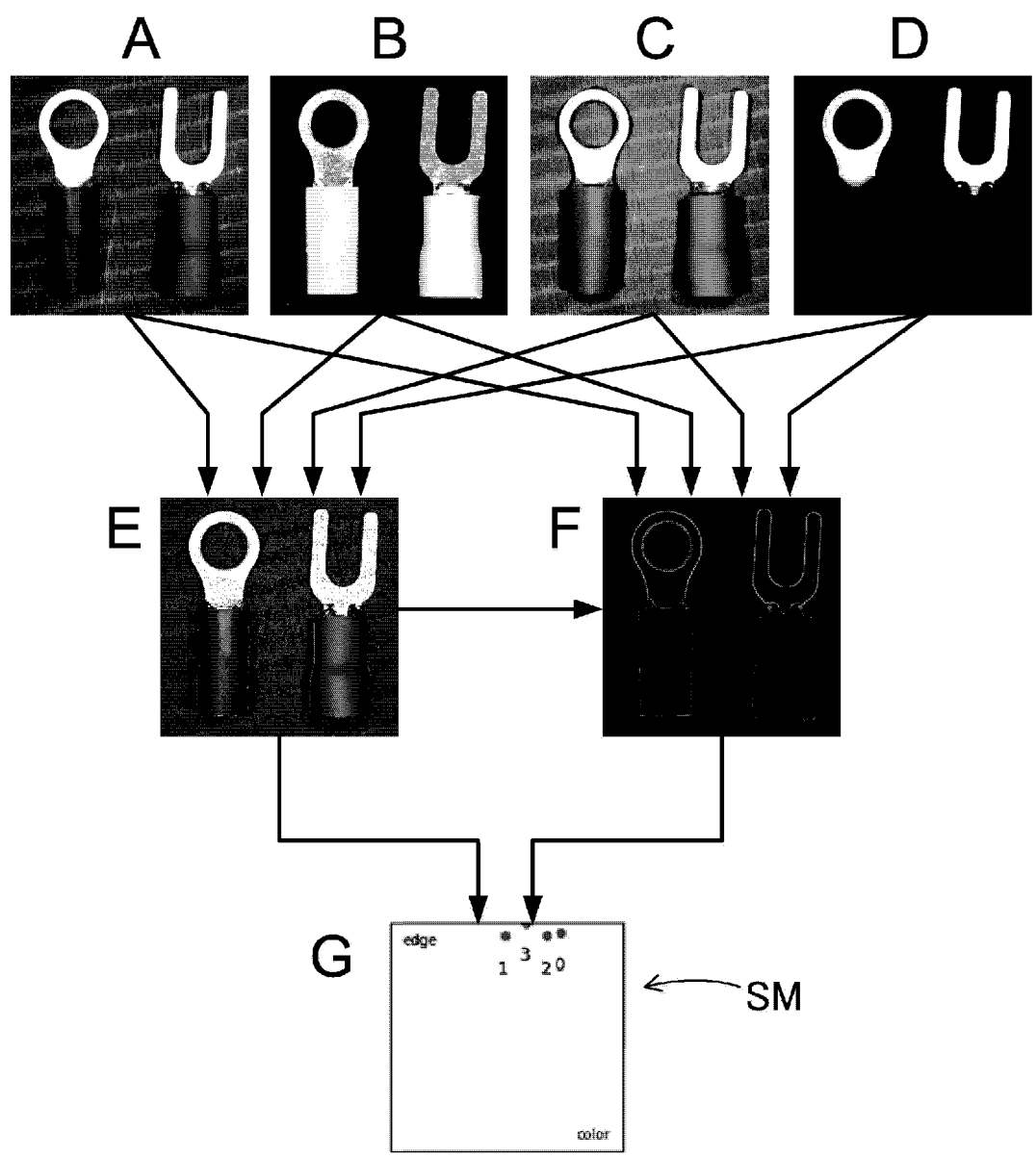
FIG. 12 is a schematic view showing creation of an image score map from a suggestion image group in accordance with their image scores.
Figure 13:
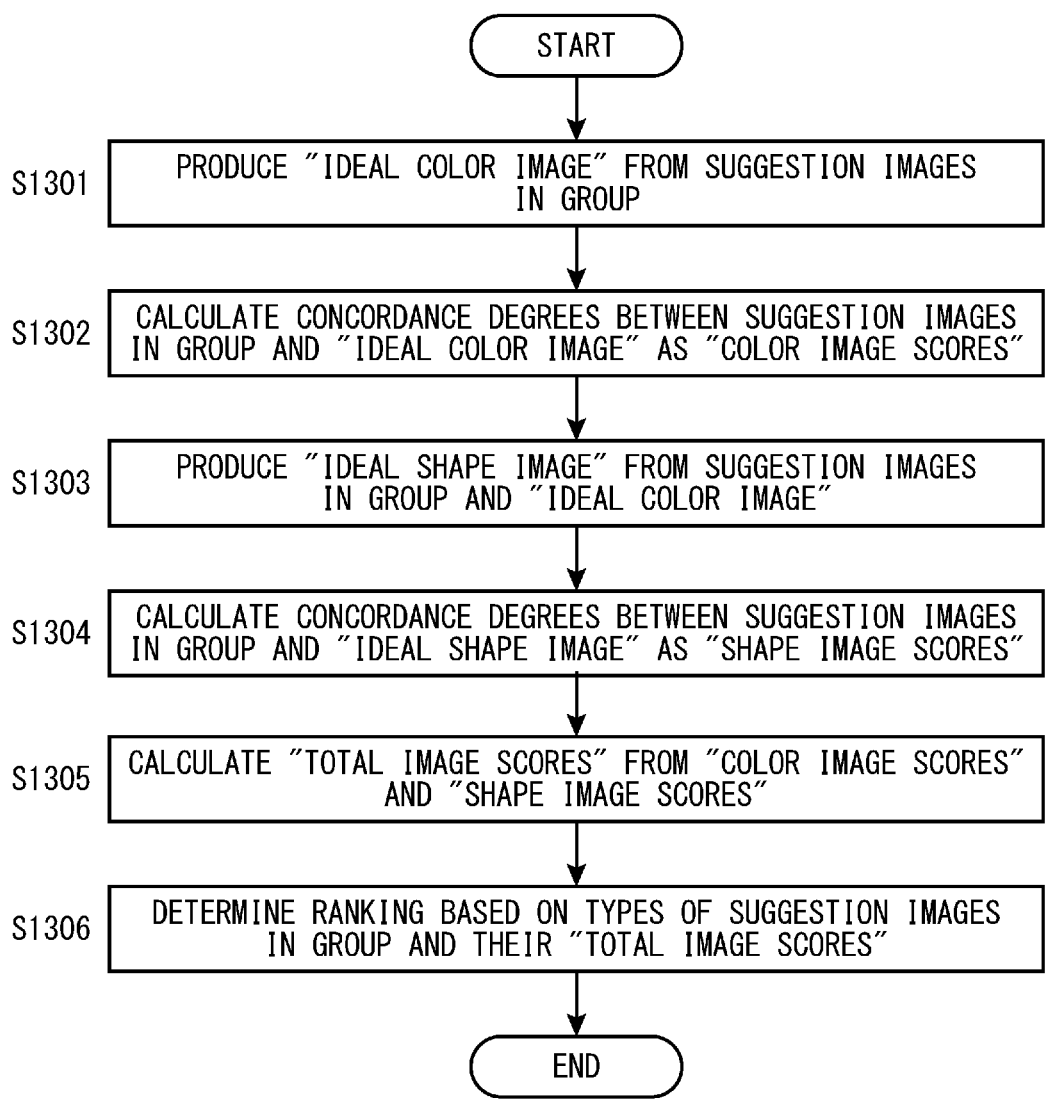
FIG. 13 is a flowchart showing a procedure of ranking images in the suggestion image group based on their image scores.
Figure 14:
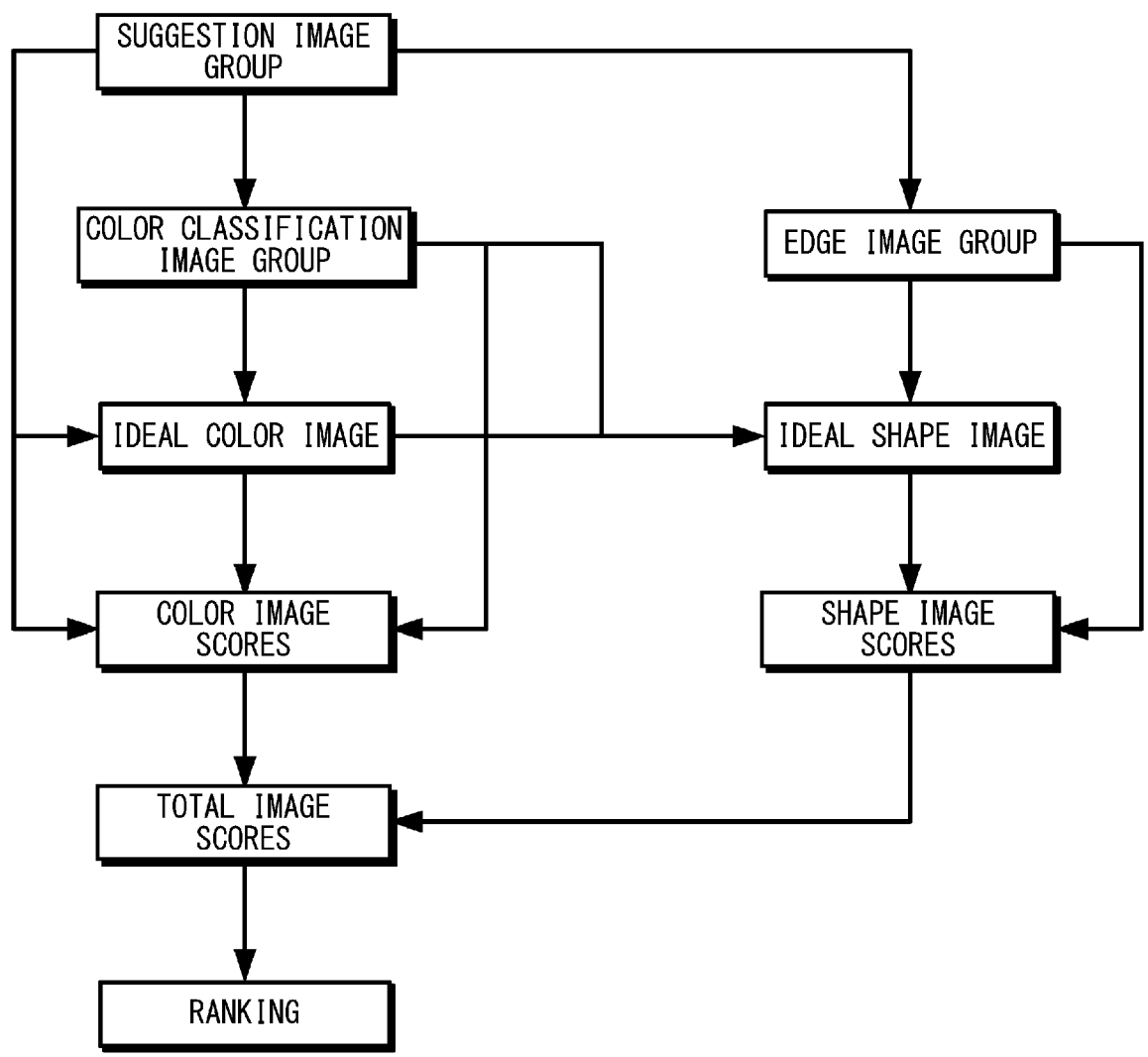
FIG. 14 is a schematic diagram showing a procedure of producing an ideal image.

A schematic procedure of determining ranking of suggestion images in a suggestion image group in accordance with their image scores is now described with reference to a schematic view of FIG. 12 and a flowchart of FIG. 13. This exemplary suggestion image group shown in FIG. 12 includes four suggestion images A to D. An "ideal color image" is first produced from the suggestion images in the group in Step S1301. In the exemplary suggestion image group shown in FIG. 12, an exemplary "ideal color image" E is produced from the four suggestion images A to D in the group. In this embodiment, a color classification image group is first created from the suggestion image group as shown in FIG. 14. Subsequently, the ideal color image is produced from the suggestion image group and the color classification image group. Subsequently, concordance degrees between the suggestion images in the suggestion image group and the "ideal color image" are calculated as "color image scores" in Step S1302. In this embodiment, the color image scores are calculated based on the suggestion image group, the color classification image group, and the ideal color image.

Subsequently, an "ideal shape image" is produced from the suggestion images in the suggestion image group and the "ideal color image" in Step S1303. In the exemplary suggestion image group shown in FIG. 12, an exemplary "ideal shape image" F is produced from the four suggestion images A to D in the suggestion image group. Subsequently, concordance degrees between the suggestion images in the suggestion image group and the "ideal shape image" are calculated as "shape image scores" in Step S1304. It is noted that the "color image scores" and the "shape image scores" can be calculated in parallel, or the "color image scores" can be calculated before the "shape image scores" are calculated.

Subsequently, "total image scores" of the suggestion images in the suggestion image group are calculated from the "color image scores" and the "shape image scores" in Step S1305. An image G in FIG. 12 shows an exemplary image score map SM including four points plotted on a chart having horizontal and vertical axes, which correspond to the "color (color) image score" and the "shape (edge) image score", respectively. The points 0, 1, 2, and 3 shown in the image G in FIG. 12 indicate the image scores of the suggestion images A, B, C and D, respectively. Subsequently, ranking is determined in accordance with types of the suggestion images in the group and their "total image scores" in Step S1306. For example, suggestion images that have the highest scores corresponding to color and shape are selected from the image score map shown in the image G.

(Ideal Color Image)

An image appearance of an inspection object will be changed depending on image production conditions (photo shooting conditions in this embodiment). For example, in the case in which a plurality of suggestion images are captured under different photo shooting conditions, some of them look good and others look bad from the viewpoint of color. Good parts are extracted from the plurality of suggestion images, which are captured under different photo shooting conditions, to produce the available best image, i.e., the ideal color image by composing the good parts. To determine such a good part from the viewpoint of color, "color classification" and "color priority" are used.

(Color Classification and Color Priority)

Exemplary color priorities can be assigned in the order of chromatic color, achromatic color, and off-scale. Parts of each suggestion image are classified according to colors. Proper color parts are selected the parts classified in the order of the color priority. An ideal color image is produced by composing the most proper color parts that are selected from the suggestion images. The suggestion images are evaluated based on the composite ideal color image. Specifically, the image score calculator 22 calculates image scores of the suggestion image. The higher the image score of a suggestion image, the closer the difference between the suggestion image and the ideal image.

(Production of Ideal Color Image)

Figure 15:
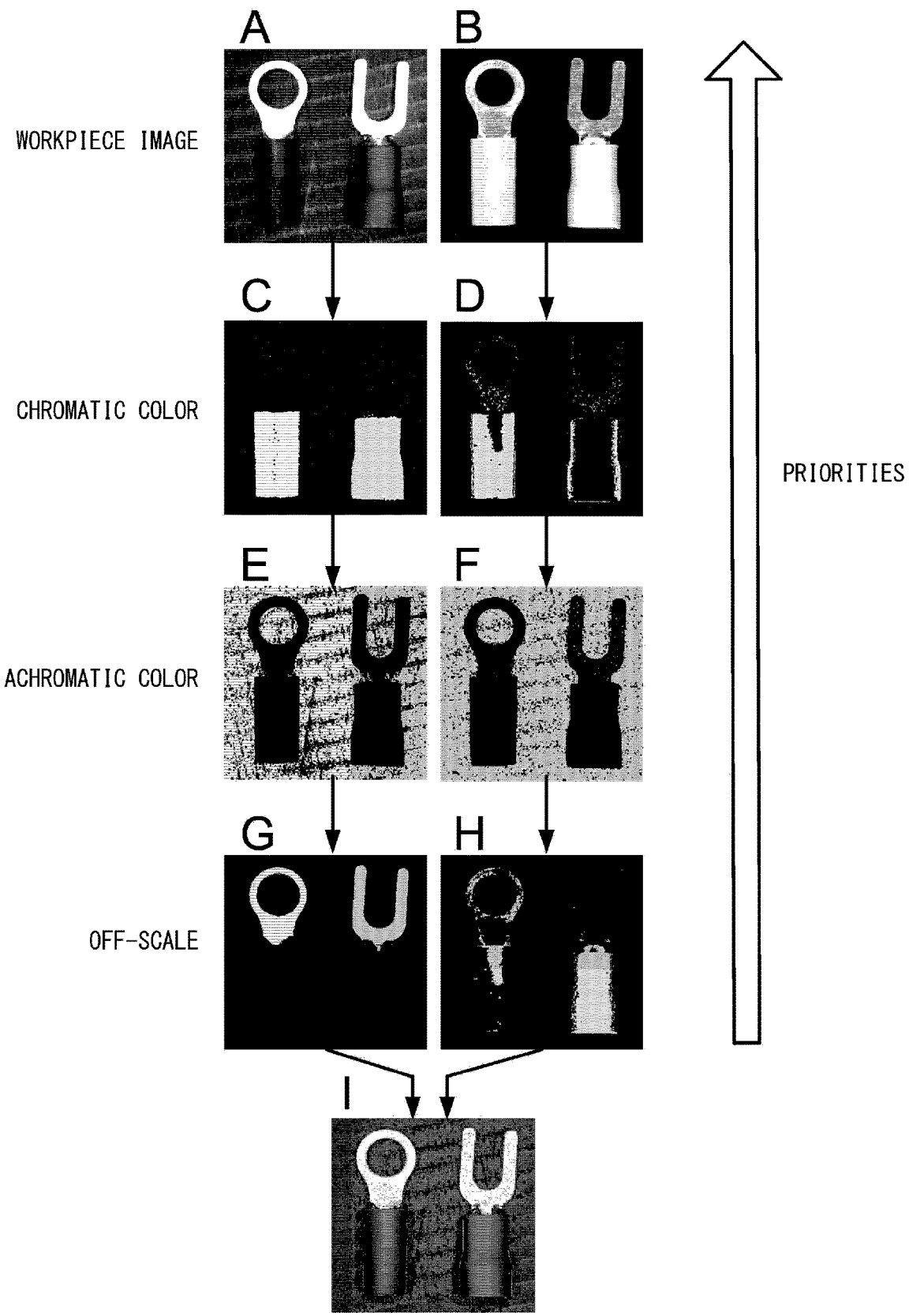
FIG. 15 is a schematic view showing a procedure of practically producing an ideal color image.

An exemplary procedure of producing an ideal color image is now described with reference to FIG. 15. The ideal color image is produced from two suggestion images A and B in this exemplary procedure. Parts of each suggestion image are first classified according to colors. In this embodiment, parts of each suggestion image are classified into chromatic color, achromatic color and off-scale parts. Specifically, chromatic color parts are extracted in an image C by classifying parts of the suggestion image A according to colors. Similarly, achromatic and color off-scale parts are extracted in images E and G, respectively. Also, chromatic color parts are extracted in an image D by classifying parts of the suggestion image B according to colors. Similarly, achromatic and color off-scale parts are extracted in images F and H, respectively. More proper pixels are selected from one of the suggestion images A and B, which have been classified according to colors, in the order of the color priority throughout all the pixels to produce the ideal color image. Finally, an image I is produced as the ideal color image from the suggestion images A and B.

(Determination in Color Classification)

Figure 16:
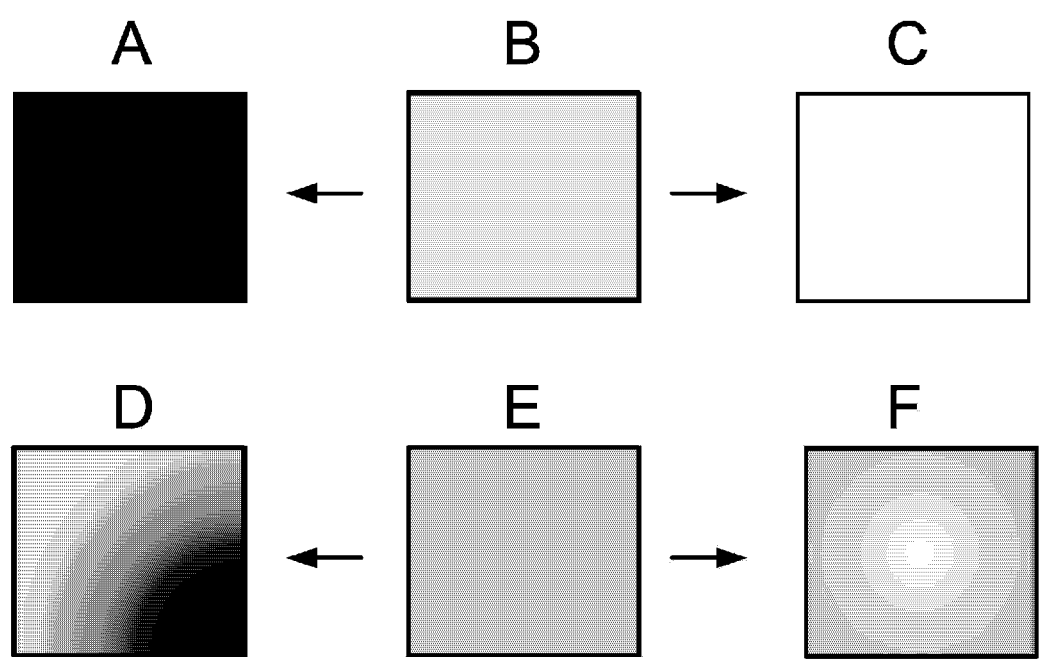
FIG. 16 is a schematic view showing a reason to distinguish chromatic colors from the others.

The reasons to distinguish chromatic color parts from the other parts in the color classification are now described with reference to 16. Even if images of one inspection object are captured, image appearances of the common inspection object will be changed depending on photo shooting conditions. An amount of light and light components can be provided as two main reasons. Underexposure or overexposure will occur in the case of a too much or too small amount of light. For example, images A and C correspond to underexposed and overexposed images, respectively, with reference to an image B in FIG. 16. The light components refer to components of light that is reflected from an inspection object when the inspection is irradiated with illumination light. The light components include regular and diffuse reflection components. For example, images D and F correspond to regular and diffuse reflection images, respectively, with reference to an image E in FIG. 16. For these reasons, a chromatic color part of an image may be changed to the other parts in some amounts of light or depending on light components when the image is captured. Contrary to this, achromatic color and off-scale parts cannot be basically changed to a chromatic color part. In other words, if a part of the common inspection object is classified to both a chromatic color part and other part(s), the part must be classified to a chromatic color part.

Because chromatic color is given a higher priority, chromatic color parts can be reliably distinguished from the other parts in the color classification. In the case in which an image of an inspection object is captured by a monochrome camera, a chromatic color part is represented by an achromatic color. In other words, determination of achromatic color parts is reliable next to chromatic color parts. Because color information is completely lost in off-scale parts, the off-scale parts are less reliable than chromatic and achromatic color parts. However, the off-scale parts sometimes include useful information other than color information such as gloss and three-dimensional continuity. From this viewpoint, the off-scale parts are not useless. Consequently, color priorities are assigned in the order of chromatic color, achromatic color, and off-scale. The priority becomes higher toward the top images in examples shown in FIGS. 17E to 17T.

(Chromatic Color Image)

Classification of pixels of each suggestion image into chromatic color, achromatic color and off-scale pixels is now described in the color classification. Classification into a chromatic color requires a high chroma, a constant hue in the surrounding area, and in-scale.

(Achromatic Color Image)

Classification into an achromatic color requires a low chroma, constant lightness in the surrounding area, and in-scale. It is noted that the classification into an achromatic color excludes off-scale but does not exclude underexposure. The reason is that, in the case of a glossy black surface, off-scale can include only gloss information, which does not relate to colors, but underexposure can include black, which relates to colors.

(Off-Scale Image)

Classification into off-scale is required to satisfy all the requirements for chromatic or achromatic color other than in-scale but not to satisfy in-scale.

(Calculation of Image Scores of Suggestion Images)

A procedure of calculating image scores of suggestion images is now described with reference to FIG. 17. Eight cases of comparison between ideal and suggestion images and their image scores are shown in FIG. 17. The higher the image score, the closer the difference between ideal and suggestion images. In this embodiment, the image scores are represented in percentage from 0% to 100%. In the case in which classification of pixels in the suggestion image agrees with the ideal image, if their chromas agree with each other the pixels are given an image score of 100%, and if their hues disagree with each other the pixels are given an image score of 0%. The suggestion image is given an average image score that is obtained by averaging image scores of all the pixels.

For example, a first row (case 1) in FIG. 17 corresponds to a combination in which pixels in an ideal image are classified into a chromatic color, and the pixels in a suggestion image are classified into a chromatic color. In this combination, if their colors are the same (exact agreement), the pixels in the suggestion image are given an image score of 100%. A second row (case 2) corresponds to a combination in which pixels in the ideal image are classified into a chromatic color, and the pixels in the suggestion image are classified into a chromatic color. In this combination, if their chromas or lightnesses are different, an image score to be given to the pixels in the suggestion image varies in accordance with difference between their chromas or lightnesses. In the second row, an exemplary image score of 75% is given to the pixels in the suggestion image. In this embodiment, an image score is calculated according to 1−(absolute value of maximum difference in any of R, G and B values between ideal and suggestion images)/255. A third row (case 3) corresponds to a combination in which pixels in the ideal image are classified into a chromatic color, and the pixels in the suggestion image are classified into a chromatic color. In this combination, if their hues are different, the pixels in the suggestion image are given an image score of 0%. A fourth row (case 4) corresponds to a combination in which pixels in the ideal image are classified into a chromatic color, and the pixels in the suggestion image are classified into an achromatic color. In this combination, their color classifications are different, and as a result the pixels in the suggestion image are given an image score of 0%.

Also, a fifth row (row 5) in FIG. 17 corresponds to a combination in which pixels in the ideal image are classified into an achromatic color, and the pixels in the suggestion image are classified into an achromatic color. In this combination, if their achromatic colors are the same (exact agreement), the pixels in the suggestion image are given an image score of 100%. Although a chromatic color is given a higher priority than an achromatic color in the production of ideal image, an image score is given to pixels in a suggestion image irrespective of chromatic or achromatic color (no weight difference) in the calculation of image scores. In the case in which pixels in both ideal and suggestion images are classified into an achromatic color, unless an image score of 100% is not given to the pixels of the suggestion image, suggestion image ranking will be determined in accordance with only a shape of an achromatic color inspection object. A sixth row (case 6) corresponds to a combination in which pixels in the ideal image are classified into an achromatic color, and the pixels in the suggestion image are classified into an achromatic color. In this combination, if their lightnesses are different, an image score to be given to the pixels in the suggestion image varies in accordance with difference between their lightnesses. In the sixth row, an exemplary image score of 75% is given to the pixels in the suggestion image.

Also, a seventh row (row 7) in FIG. 17 corresponds to a combination in which pixels in the ideal image are classified into off-scale, and the pixels in the suggestion image are classified into off-scale chroma. In this combination, if their off-scale pixels are the same (exact agreement), the pixels in the suggestion image are given an image score of 100%. In some cases classification to achromatic color can be better than off-scale, while classification to off-scale color can be better than achromatic in some other cases as discussed later. An image score is given to pixels in a suggestion image irrespective of chromatic color or off-scale (no weight difference) in the calculation of image scores. An eighth row (case 8) corresponds to a combination in which pixels in the ideal image are classified into off-scale, and the pixels in the suggestion image are classified into off-scale. In this combination, if some of their off-scale pixels are different, an image score to be given to the pixels in the suggestion image varies in accordance with the difference. In the eighth row, an exemplary image score of 50% is given to the pixels in the suggestion image.

(Ideal Shape Image)

Production of an ideal shape image is now described. A shape that is included in an workpiece image, for example, edge information that is obtained from the shape can include superfluous information or be insufficient. In the calculation of image scores, if edge information is insufficient, additional information is required to complement the edge information. Contrary to this, if superfluous edge information is included, useful information is necessarily selected from the superfluous edge information, and useless information is necessarily ignored. For example, in the case in which brightness is too high to bring parts of an image to off-scale, detailed shapes can be lost and only a rough large shape can remain. In the case in which reflection of illumination light appears in gloss of a workpiece, a shape irrelevant to an inspection object will be seen in a workpiece image. In the case in which a three-dimensional part of an inspection object casts its shadow on other parts of the inspection object, a shape of the three-dimensional part can be seen double.

Even in the case in which it cannot be determined whether shape information includes superfluous information or whether the shape information is insufficient based on a single workpiece image that is captured under a single set of image production conditions, useful information can be selected from the shape information by comparison between a plurality of workpiece images that are captured under a plurality of sets of image production conditions. For example, a shape that commonly appears in the plurality of workpiece images, which are captured under a plurality of sets of image production conditions, is more reliable than a shape that appears only in a single workpiece image that is captured under a single set of image production conditions. Specifically, in the case of the shadow of the three-dimensional part, a shadow that appears when the inspection object is irradiated with illumination light in one direction does not appear when the inspection object is irradiated with illumination light in another direction.

(Production Procedure of Ideal Color and Shape Images)

Figure 18:
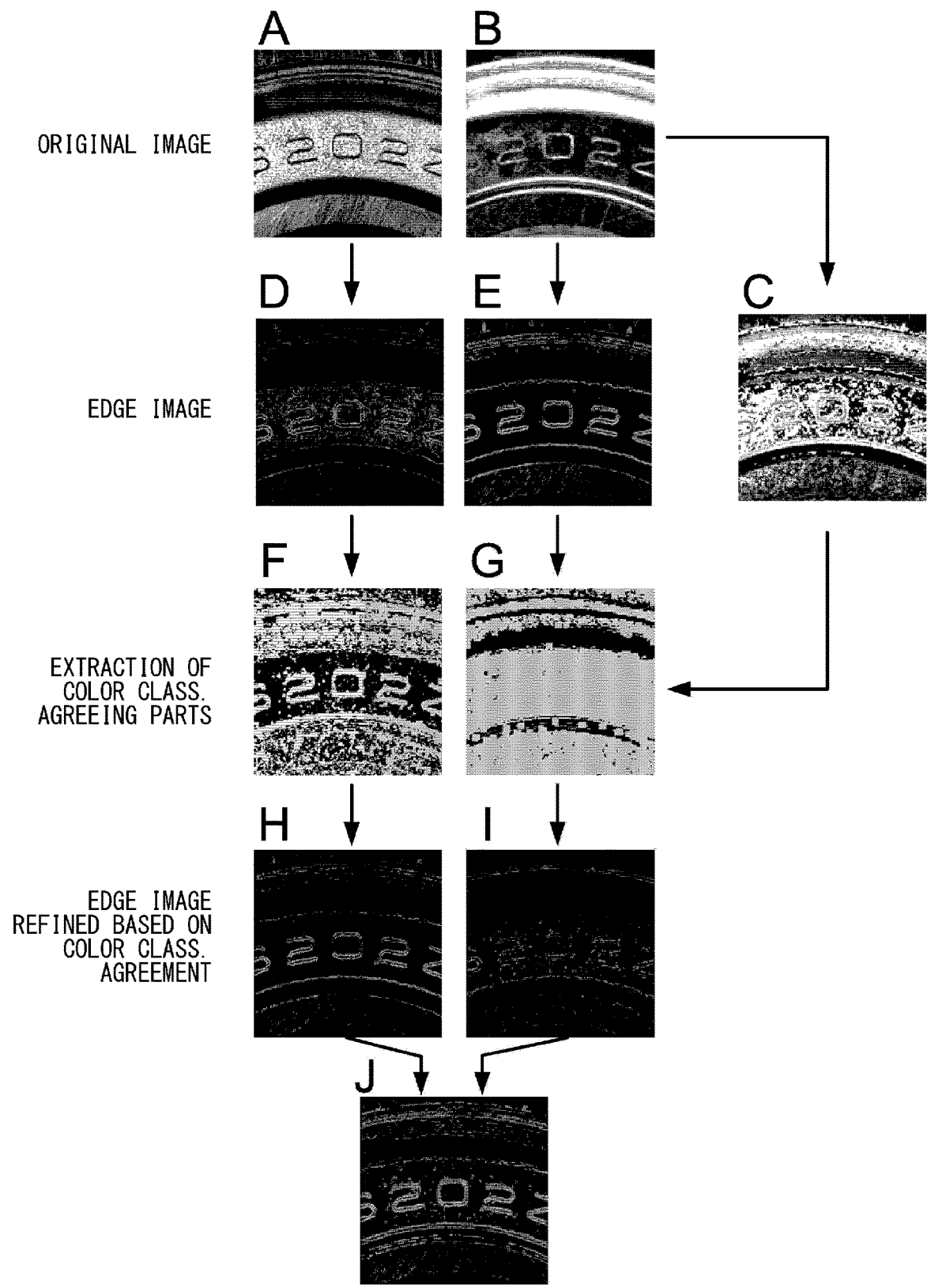
FIG. 18 is a schematic view showing a procedure of producing an ideal color and shape image.

A procedure of producing ideal color and shape images is now described with reference to FIG. 18. The ideal color image is first produced from original workpiece images. In an exemplary procedure shown in FIG. 18, an image C as the ideal color image is produced from original workpiece images A and B.

In addition, edge information is extracted from each original workpiece image. Existing suitable algorithms can be used to extract outlines (i.e., edge information) of an inspection object from the workpiece images. Examples of the algorithms can be provided by Canny edge detector, differential filter, Prewitt filter, Sobel filter, and the like. In the exemplary procedure shown in FIG. 18, edge images D and E are produced from the original workpiece images A and B. Subsequently, color classification results of pixels corresponding to edges (edge pixels) are compared with color classification results of the ideal color image. Only edge pixels that agree with the color classification results of the ideal color image are selected as useful edge pixels. One of interest useful edge pixels that has the maximum value among all the edge images is selected throughout all the pixels to produce the ideal shape image. In the exemplary procedure shown in FIG. 18, images F and G are produced by extracting parts of the suggestion images A and B that agree with the color classification results of the ideal color image C. Useful images H and I are produced by extracting parts of the edge images D and E corresponding to the useful parts of the images F and G. An ideal shape image J is produced by selecting one of useful edge pixels in the useful images H and I corresponding to one interest pixel that has the maximum value between the useful images H and I throughout all the pixels. It can be seen that the ideal shape image J suppresses fine texture, which differently appears depending on different suggestion image, and emphasizes common shapes (imprints in FIG. 18), which appear in all the suggestion images.

(Removal of Texture Information)

A procedure of removing texture information is now described. It is first considered that an ideal shape image is produced on the assumption that the ideal shape image includes texture information without extraction of edges in accordance with color classification result comparison. If the texture information remains in the ideal shape image, or if an image that includes the texture information is likely to receive a higher image score, an image that includes undesired texture information will be selected as an ideal image, and as a result validity of suggestion images will be low. For example, texture information in the workpiece images A and B shown in FIG. 18 provide high edge intensity. Different inspection objects have different spatial frequencies. For this reason, texture information is hardly removed by using an edge intensity or spatial frequency that is obtained from each workpiece image in filtering. To address this, not information that is obtained from each workpiece image but information that is obtained from all the workpiece images is used to suppress texture information. Texture information is detected by using evaluation indices other than edge intensity or spatial frequency. In this embodiment, edge information is classified to color-classification-result agreement and disagreement classes by using the ideal color image.

(Edge Detection)

Edge detection is performed when edge information is classified to color-classification-result agreement and disagreement classes by using an ideal color image. The Sobel filter, which calculates absolute values of X and Y derivatives, is used as edge detection in this embodiment.

An image inspection apparatus, an image-inspection-apparatus control device, an image inspection method, an image inspection program, and a computer-readable storage medium or storage device storing the image inspection program according to the present disclosure can be suitably used to capture an image of an inspection object such as a workpiece and determine failure/no-failure of the inspection object based on the image captured.

What is claimed is:

1. An image inspection apparatus comprising:
an illuminator that irradiates an inspection object with illumination light;
a camera that receives light that is reflected from the inspection object, which is irradiated by the illuminator, and produces a workpiece image;
a display that displays the workpiece image, which is produced by the camera;
an image production condition controller that selects between different image production conditions of the workpiece image production to produce a plurality of workpiece images by controlling the camera;
an image score calculator that calculates image scores of the plurality of workpiece images, which are produced under the different image production conditions changed by the image production condition controller, as evaluation values of the plurality of workpiece images based on a plurality of feature quantities that represent features of the plurality of workpiece images;
an image production condition specifier that receives, when two or more thumbnails corresponding to two or more of the plurality of workpiece images that have a higher image score are displayed on the display, selection of one from the two or more thumbnails to specify a set of image production conditions corresponding to the thumbnail selected;

wherein the different image production conditions include
a single-shot set of conditions under which a single-shot image is produced, and
a composition series of sets of conditions under which images are captured to produce a composite image from the images captured under the sets of conditions, and wherein the display shows a reference information display area that indicates reference information representing whether each of the plurality of the thumbnails is corresponding to the workpiece image under the single-shot set of conditions or corresponding to the composite image in response to the displaying of the two or more thumbnails, which correspond to two or more of the plurality of workpiece images that have a higher image score as compared to other of the plurality of workpiece images.

2. The image inspection apparatus according to claim 1, wherein the image score calculator calculates image scores corresponding to first and second feature quantities, which are the plurality of feature quantities and different from each other, of the plurality of workpiece images, and
wherein the display displays a thumbnail corresponding to a workpiece image that has a higher image score corresponding only one of the first and second feature quantities as one of the two or more thumbnails.

3. The image inspection apparatus according to claim 1, wherein the image score calculator calculates image scores corresponding to first and second feature quantities, which are the plurality of feature quantities and different from each other, of the plurality of workpiece images, and
wherein the display displays a thumbnail corresponding to a workpiece image that has higher image scores corresponding both the first and second feature quantities as one of the two or more thumbnails.

4. The image inspection apparatus according to claim 1 further comprising a target inspection area specifier that receives specification of a target inspection area,
wherein the plurality of feature quantities include first and second feature quantities that relate to shape and color, respectively, and
wherein the image score calculator calculates image scores corresponding to the first and second feature quantities, which relate to shape and color, based on edges and color information of the inspection object, respectively, that are included in the target inspection area, which is specified by the target inspection area specifier.

5. The image inspection apparatus according to claim 1 further comprising a feature quantity specifier that receives selection of at least one to be used for inspection from the plurality of feature quantities,
wherein the image score calculator calculates image scores based on the at least one feature quantity specified, and
wherein the display displays two or more thumbnails corresponding to two or more of the plurality of workpiece images that have a higher image score corresponding to the at least one feature quantity, which is calculated by the image score calculator.

6. The image inspection apparatus according to claim 1, wherein the image score calculator calculates image scores in accordance with a concordance degree between an ideal image that is produced for inspection based on the feature quantities and each workpiece image.

7. The image inspection apparatus according to claim 1, wherein the image score calculator calculates image scores of workpiece images that are captured under the single-shot set of conditions that are used to produce a single-shot image and the composition series of sets of conditions that are used to produce a composite image, and the display displays thumbnails corresponding to both at least one workpiece image that has a higher image score corresponding to the single-shot set of conditions and at least one workpiece image that has a higher image score corresponding to the composition series of sets of conditions.

8. The image inspection apparatus according to claim 1, wherein the reference information display area indicates as the reference information the number of capturing times that are required to produce a composite workpiece image corresponding to the thumbnail that is produced by capturing images under the composition series of sets of conditions.

9. The image inspection apparatus according to claim 1, wherein the composition series of sets of conditions includes
a first composition series of sets of conditions that are used to produce a composite image by capturing images by irradiating the inspection object with illumination light in different directions whereby enhancing edges of a shape of the inspection object, and
a second composition series of sets of conditions that are used to produce a composite image by capturing images by irradiating the inspection object with illumination light in different exposure times whereby extending a dynamic range of the camera.

10. The image inspection apparatus according to claim 1, wherein the display displays a top thumbnail that has the highest image score larger than other thumbnail or thumbnails that have the second highest or lower image scores.

11. An image inspection method of inspecting an inspection object that is irradiated with illumination light by an illuminator by receiving light that is reflected from the inspection object to produce a workpiece image by using a camera, the method comprising:
creating different image production conditions by using an image production condition controller to control the camera, which captures images of the inspection object under the different image production conditions, whereby producing a plurality of workpiece images, the different image production conditions including
a single-shot set of conditions under which a single-shot image is produced, and
a composition series of sets of conditions under which images are captured to produce a composite image from the images captured under the sets of conditions;
calculating image scores of the plurality of workpiece images, which are produced under the different image production conditions, as evaluation values of the plurality of workpiece images based on a plurality of feature quantities that represent features of the plurality of workpiece images by using an image score calculator;
displaying two or more thumbnails corresponding to two or more of the plurality of workpiece images that have a higher image score as compared to other of the plurality of workpiece images on a display and a reference information display area that indicates reference information representing whether each of the plurality of the thumbnails is corresponding to the workpiece image under the single-shot set of conditions or corresponding to the composite image in response to the displaying of the two or more thumbnails; and receiving selection of one inspection image from the two or more thumbnails, which are displayed on the display, to specify a set of inspection conditions corresponding to the inspection image selected.

12. The image inspection method according to claim 11, wherein the reference information display area indicates reference information representing the single-shot set or composition series of sets under which the workpiece image corresponding to each thumbnail is produced in the displaying of the two or more thumbnails, which correspond to two or more of the plurality of workpiece images that have a higher image score.

* * * * *